US012568985B2

(12) United States Patent
Slattengren et al.

(10) Patent No.: US 12,568,985 B2
(45) Date of Patent: Mar. 10, 2026

(54) MILKFAT OR BUTTERFAT FORMULATIONS

(71) Applicant: Savor Foods Limited, San Jose, CA (US)

(72) Inventors: Aleesha Slattengren, San Jose, CA (US); Kathleen Alexander, San Jose, CA (US); Nikifar Lazouski, San Jose, CA (US); Ailin Zhang, San Jose, CA (US)

(73) Assignee: Savor Foods Limited, San Jose, CA (US)

( * ) Notice: Subject to any disclaimer, the term of this patent is extended or adjusted under 35 U.S.C. 154(b) by 0 days.

(21) Appl. No.: 18/428,575

(22) Filed: Jan. 31, 2024

(65) Prior Publication Data

US 2024/0260599 A1 Aug. 8, 2024

Related U.S. Application Data

(60) Provisional application No. 63/450,587, filed on Mar. 7, 2023, provisional application No. 63/443,296, filed on Feb. 3, 2023.

(51) Int. Cl.
*A23D 9/00* (2006.01)

(52) U.S. Cl.
CPC ...................................... *A23D 9/00* (2013.01)

(58) Field of Classification Search
None
See application file for complete search history.

(56) References Cited

U.S. PATENT DOCUMENTS

| | | | |
|---|---|---|---|
| 2,835,691 A | 5/1958 | Sauter | |
| 3,006,771 A | 10/1961 | Babayan | |
| 5,258,197 A | 11/1993 | Wheeler et al. | |
| 5,378,490 A | 1/1995 | Wheeler et al. | |

(Continued)

FOREIGN PATENT DOCUMENTS

| | | |
|---|---|---|
| JP | H021799 A | 1/1990 |
| JP | 2020005628 A | 1/2020 |

(Continued)

OTHER PUBLICATIONS

Wikipedia, "Paraffin oxidation", Oct. 8, 2021 retrieved on Oct. 16, 2023 from https://en.wikipedia.org/w/index.php?title=Paraffin_oxidation&oldid=1048922553; entire document, especially p. 1 para 1.

(Continued)

*Primary Examiner* — Lien T Tran

(74) *Attorney, Agent, or Firm* — Jeffrey Schox; Randy Mehlenbacher

(57) ABSTRACT

A fat formulation can include triacylglycerides that can be made of glycerol esterified with straight-chain saturated fatty acids, where a solid fat content as a function of temperature of the triacylglycerides differs from a solid fat content of butterfat by at most 0.1 at any temperature between 0° C. and 40° C. A fat formulation can include triglycerides that include straight-chain, saturated fatty acids selected from a distribution of fatty acids with between 4 and 24 carbon atoms, where the distribution comprises a non-monotonic change in relative fatty acid content between the fatty acids with between 4 and 24 carbon atoms.

11 Claims, 9 Drawing Sheets

+

(56) References Cited

U.S. PATENT DOCUMENTS

| | | | |
|---|---|---|---|
| 5,380,544 A | 1/1995 | Klemann et al. | |
| 5,395,629 A | 3/1995 | Bertoli et al. | |
| 5,411,756 A | 5/1995 | Wheeler et al. | |
| 5,456,939 A | 10/1995 | Wheeler et al. | |
| 5,492,714 A * | 2/1996 | Guskey | C07C 69/30 |
| | | | 426/607 |
| 5,552,174 A | 9/1996 | Wheeler et al. | |
| 5,565,232 A | 10/1996 | Wheeler et al. | |
| 5,645,881 A | 7/1997 | Tancibok et al. | |
| 5,662,953 A | 9/1997 | Wheeler et al. | |
| 6,162,483 A | 12/2000 | Wester | |
| 7,582,317 B2 | 9/2009 | Barclay et al. | |
| 7,637,968 B2 | 12/2009 | Murphy | |
| 7,645,473 B2 | 1/2010 | Herzing et al. | |
| 9,034,612 B2 | 5/2015 | Lam et al. | |
| 9,332,771 B2 | 5/2016 | Shulman et al. | |
| 9,849,071 B2 | 12/2017 | Fack et al. | |
| 10,004,247 B2 | 6/2018 | Shulman et al. | |
| 11,292,989 B2 | 4/2022 | Oonishi et al. | |
| 2002/0001660 A1 * | 1/2002 | Takeuchi | A23D 9/00 |
| | | | 426/607 |
| 2003/0143313 A1 * | 7/2003 | Ikuina | C11B 3/00 |
| | | | 426/607 |
| 2008/0190160 A1 | 8/2008 | Tran et al. | |
| 2008/0193624 A1 | 8/2008 | Shulman et al. | |
| 2013/0252405 A1 | 9/2013 | Li et al. | |
| 2015/0266802 A1 | 9/2015 | Balakrishnan et al. | |
| 2016/0133843 A1 | 5/2016 | Rogers et al. | |
| 2016/0227810 A1 | 8/2016 | Akoh et al. | |
| 2020/0045991 A1 | 2/2020 | Watanabe et al. | |
| 2020/0078464 A1 | 3/2020 | Senanayake et al. | |
| 2020/0332223 A1 | 10/2020 | Chen et al. | |
| 2021/0324301 A1 | 10/2021 | Lorén et al. | |
| 2022/0211066 A1 | 7/2022 | Wang et al. | |
| 2023/0404101 A1 | 12/2023 | Alexander et al. | |

FOREIGN PATENT DOCUMENTS

| | | | |
|---|---|---|---|
| WO | 9315612 A1 | 8/1993 | |
| WO | WO-2016007026 A1 * | 1/2016 | A23D 9/00 |
| WO | 2021255198 A1 | 12/2021 | |
| WO | 2023163639 A1 | 8/2023 | |
| WO | 2023244719 A1 | 12/2023 | |

OTHER PUBLICATIONS

"Butterfat", Wikipedia, https://en.wikipedia.org/wiki/Butterfat, first downloaded.
"Caprenin", Wikipedia, https://en.wikipedia.org/wiki/Caprenin, first downloaded.
"Handbook of Milk of Non-Bovine Mammals", Editor(s):Young W. Park, George F.W. Haenlein, First published:Jan. 13, 2006, Print ISBN:9780813820514, Online ISBN:9780470999738, DOI:10.1002/9780470999738.
"Neobee Medium Chain Triglycerides Brochure", Food Nutrition Pharmaceuticals, Stephan Lipid Nutrition, https://www.stepan.com/content/dam/stepan-dot-com/webdam/website-product-documents/literature/food-nutrition-pharmaceutical/NEOBEEBrochure.pdf, first downloaded Dec. 13, 2023.
"Oils—Melting points", The Engineering ToolBox (2008). Oils—Melting points. [online] Available at: https://www.engineeringtoolbox.com/oil-melting-point-d_1088.html [Accessed Day Month Year].
"Product Development of Cheese", Green-On Blog, Nov. 16, 2023.
"Product Development of Cookie Filling", Green-On Blog, https://www.green-on.se/product-development-cookie-filling/, Nov. 8, 2023.
"Stepan 108", Industrial Lubricants and Additives Product Bulletin, Stepan, Dec. 2011.
"The Lipid Handbook", Third Edition—CRC Press (2007), Taylor & Francis Group, 6000 Broken Sound Parkway NW, Suite 300 Boca Raton, FL 33487-2742.
Andrei, Mihai , et al., "Scientists figure out a way to add fat to lab-grown meat", ZME Science, Nov. 18, 2021 in Future, News, Nutrition.

Artz, W.E. , et al., "Reduced and zero calorie lipids in food", Modifying Lipids for Use in Food, Woodhead Publishing Series in Food Science, Technology and Nutrition, Sep. 2006, pp. 444-461.
Bhattacharya, K. , et al., "Speciality oils and their applications in food", Modifying Lipids for Use in Food, Woodhead Publishing Series in Food Science, Technology and Nutrition, Sep. 2006, pp. 539-566.
Changade, S.P. , et al., "Physical Proporties of Ghee Prepared From High Acidic Milk-II", J. Dairying, Foods & H.S.25 (2) : 101-104, 2006.
Clulow, Andrew J., et al., "Milk mimicry—Triglyceride mixtures that mimic lipid structuring during the digestion of bovine and human milk", Food Hydrocolloids 110 (2021) 106126.
De Graef, Veerie , et al., "Effect of TAG composition on the solid fat content profile, microstructure, and hardness of model fat blends with identical saturated fatty acid content", Eur. J. Lipid Sci. Technol. 2012, 000, 0000-0000.
Dreher, Johannes , et al., "Formation and characterization of plant-based emulsified and crosslinked fat crystal networks to mimic animal fat tissue", Journal of Food Science, vol. 85, Iss. 2, 2020.
Dreher, Johannes , et al., "Influence of protein content on plant-based emulsified and crosslinked fat crystal networks to mimic animal fat tissue", Food Hydrocolloids 106 (2020) 105864.
Hammond, E. , et al., "Filled and artificial dairy products and altered milk fats", Modifying Lipids for Use in Food, Woodhead Publishing Series in Food Science, Technology and Nutrition, Sep. 2006, pp. 462-487.
Knothe, Gerhard , et al., "A Comprehensive Evaluation of the Melting Points of Fatty Acids and Esters Determined by Differential Scanning Calorimetry", Journal of the American Oil Chemists' Society, Sep. 2009.
Legrand, Philippe , et al., "The Complex and Important Cellular and Metabolic Functions of Saturated Fatty Acids", Lipids (2010) 45:941-946.
Lindsten, Per Olof, "Swedish chemists make food from electricity and carbon dioxide", Power to Food, Mar. 16, 2021.
Marquez, Andres L., et al., "Solid Fat Content Estimation by Differential Scanning Calorimetry: Prior Treatment and Proposed Correction", J Am Oil Chem Soc (2013) 90:467-473.
Martini, S. , et al., "Structure and properties of fat crystal networks", Modifying Lipids for Use in Food, Woodhead Publishing Series in Food Science, Technology and Nutrition, Sep. 2006, pp. 142-169.
Masterjohn, Christopher , "Fatty Acid Analysis of Grass-fed and Grain-fed Beef Tallow", The Weston A. Price Foundation, Jan. 21, 2014, https://www.westonaprice.org/author/cmasterjo/.
Norberg, S. , et al., "Chocolate and confectionery fats", Modifying Lipids for Use in Food, Woodhead Publishing Series in Food Science, Technology and Nutrition, 2006, pp. 488-516.
Ranjith, H.M. Premlal, et al., "Lipid emulsifiers and surfactants in dairy and bakery product", Modifying Lipids for Use in Food, Woodhead Publishing Series in Food Science, Technology and Nutrition, Sep. 2006, pp. 393-428.
Rubini, Milton E., "Filled Milk and Artificial Milk Substitutes", The American Journal of Clinical Nutrition, vol. 22, No. 2, Feb. 1969, pp. 163-167.
Scheeder, M. R. L. , et al., "Modifying fats of animal origin for use in food", Modifying Lipids for Use in Food, Woodhead Publishing Series in Food Science, Technology and Nutrition, Sep. 2006, pp. 306-335.
Slattengren, Aleesha , et al., "Milkfat or Butterfat Formulations", U.S. Appl. No. 18,428,575, filed Jan. 31, 2024.
Sokolenko, G.G. , et al., "Application of artificial substitutes of dairy fat", Vopr Pitan. 2012;81(6):80-3.
Southey, Flora, "Givaudan mimics animal fat cells with encapsulated coconut oil to 'reduce high fat content while improving juiciness' in plant-based", https://www.foodnavigator-usa.com, Feb. 22, 2022.
Van Erp, Harrie , et al., "Engineering the stereoisomeric structure of seed oil to mimic human milk fat", PNAS, Oct. 15, 2019, vol. 116, No. 42, 20947-20952.
Wei, Wei , et al., "Human milk fat substitutes: Past achievements and current trends", Progress in Lipid Research 74 (2019) 69-86.

(56)　　　　　References Cited

OTHER PUBLICATIONS

Xu, X. , et al., "Chemical and enzymatic interesterification of lipids for use in food", Modifying Lipids for Use in Food, Woodhead Publishing Series in Food Science, Technology and Nutrition, Sep. 2006, pp. 234-272.

"Lipids: Fats, Oils, Waxes, etc.", Internet Archive Wayback Machine, lipids.htm, Mar. 26, 2015.

"MCT Oil—26154", Available online at https://rightpathind.com/wp-contenUuploads/2019/08/Technical-Sheet-26154-1.pdf on Aug. 2019 (Year: 2019).

"Milk Facts", Milk Fats Info, http://www.milkfacts.info/Milk%20Composition/Fat.htm#:~:text=components%20of%20hormones.-,Milk%20Fat%20Chemistry,90%25%20of%20the%20milk%20fat., first downloaded Nov. 22, 2024.

Bremt, et al., "Balancing functional and nutritional quality of oils and fats: Current requirements and future trends", Dossier: Fonctionnalités des huiles (2012).

Deffense, E., "Milk Fat Fractionation Today: A Review", American Oil Chemists' Society, vol. 70, No. 12 (Dec. 1993).

Fernando, et al., "Lubricity Characteristics of Selected Vegetable Oils, Animal Fats, and Their Derivatives", Applied Engineering in Agriculture, vol. 23(1): 5-11, Jan. 2007.

Martinez, et al., "Synthetic fat from petroleum as a resilient food for global catastrophes: preliminary techno-economic w assessment and technology roadmap", Chemical Engineering Research and Design, vol. 177, Jan. 2022, pp. 255-272. (Year: 2022).

Meyer-Doring, et al., "Is It Safe To Use Synthetic Fatty Acids for Food Purposes?", Klin Wochenschr 27, 113-116 (1949). https://doi.org/10.1007/BF01471275. Feb. 15, 1949.

Pratama, et al., "Decoding the role of triacylglycerol composition in the milk fat crystallisation behaviour: A study using buffalo milk fat fractions", LWT—Food Science and Technology 186 (2023) 115274.

Roopashree, et al., "Effect of medium chain fatty acid in human health and disease", Journal of Functional foods 87 (2021 ). (Year: 2021).

Schreppler, et al., "Fat Composition and Relationship with Free Fatty Acid Distribution", U.S. Appl. No. 18/974,401, filed Dec. 9, 2024

Slattengren, et al., "Liquid or Semi-Solid Fat Formulations", U.S. Appl. No. 18/818,047, filed Aug. 28, 2024.

Venn-Watson, et al., "Efficacy of dietary odd-chain saturated fatty acid pentadecanoic acid parallels broad associated health benefits in humans: could it be essential?", Scientific Reports, May 2020, 10(1).

Verruck, et al., "Dairy foods and positive impact on the consumer's health".

Webster, et al., "The Basics of MCT Oil", Available online at https://foodinsight.org/the-basics-of-mct-oil/ on Nov. 6, 2020. (Year: 2020).

Whitmore, "Organic Chemistry", 2nd Edition (1951). Dover Publications Inc. page 256. (Year: 1951).

Arnaud, et al., "Characterisation of chicken fat dry fractionation at the pilot scale", Eur. J. Lipid Sci. Technol. 106 (2004) 591-598.

Bhatnagar, et al., "Fatty Acid Composition, Oxidative Stability, and Radical Scavenging Activity of Vegetable Oil Blends with Coconut Oil", J Am Oil Chem Soc (2009) 86:991-999.

Carmona, et al., "Characterization of macadamia and pecan oils and detection of mixtures with other edible seed oils by Raman spectroscopy", Grasas y Aceites 66 (3) Jul.-Sep. 2015, e094.

Carrin, et al., "Peanut oil: Compositional data", Eur. J. Lipid Sci. Technol. 2010, 112, 697-707.

De Spirt, et al., "Intervention with flaxseed and borage oil supplements modulates skin condition in women", British Journal of Nutrition (2009), 101, 440-445.

Dubey, et al., "Diets Enriched in Fish-Oil or Seal-Oil have Distinct Effects on Lipid Levels and Peroxidation in BioF1B Hamsters", Nutrition and Metabolic Insights 2011:4 7-17.

Garavaglia, et al., "Grape Seed Oil Compounds: Biological and Chemical Actions for Health", Biological and Chemical Actions for Health. Nutrition and Metabolic Insights 2016:9 59-64 doi: 10.4137/NMI.S32910.

Goncharov, et al., "Fatty acid composition of seeds of pumpkin (Cucurbita) varieties cultivated mechanized in the conditions of the Nonchernozem zone of the Russian Federation", ESDCA-II-2022, IOP Conf. Series: Earth and Environmental Science, 1045 (2022) 012083, doi:10.1088/1755-1315/1045/1/012083.

Haas, et al., "Simplifying biodiesel production: The direct or in situ transesterification of algal biomass", Eur. J. Lipid Sci. Technol. 2011, 113, 1219-1229.

Hoffman, et al., "Can rapeseed oil replace olive oil as part of a Mediterranean-style diet?", British Journal of Nutrition (2014), 112, 1882-1895.

Kawakami, et al., "Flaxseed oil intake reduces serum small dense low-density lipoprotein concentrations in Japanese men: a randomized, double blind, crossover study", Nutrition Journal (2015) 14:39, DOI 10.1186/s12937-015-0023-2.

Kenar, et al., "Naturally Occurring Fatty Acids: Source, Chemistry, and Uses", Fatty Acids, Chapter 2, 2017, DOI: http://dx.doi.org/10.1016/B978-0-12-809521-8.00002-7.

Mancini, et al., "Biological and Nutritional Properties of Palm Oil and Palmitic Acid: Effects on Health", Molecules 2015, 20, 17339-17361; doi:10.3390/molecules200917339.

Naik, et al., "Cocoa Butter and Its Alternatives: A Reveiw", Journal of Bioresource Engineering and Technology, Year—2014, vol. 1, pp. 07-17.

Özcan, et al., "Physico-chemical properties, fatty acid and mineral content of some walnuts (Juglans regia L.) types", Agricultural Sciences 1 (2010) 62-67.

Pathak, et al., "Value addition in sesame: A perspective on bioactive components for enhancing utility and profitability", Pharmacognosy Reviews, Jul.-Dec. 2014, vol. 8, Issue 16, pp. 147-155.

Poth, Ulrich, "Drying Oils and Related Products", Ullmann's Encyclopedia of Industrial Chemistry, Jun. 15, 2001, https://doi.org/10.1002/14356007.a09_055.

Rendina-Ruedy, et al., "Methodological considerations when studying the skeletal response to glucose intolerance using the diet-induced obesity model", BoneKEy Reports 5, Article No. 845 (2016), doi:10.1038/bonekey.2016.71.

Salem, Rababh. , "Preparation and Characteristics of Micro and Nano Wheat Germ Oil Capsules", World Journal of Dairy & Food Sciences 13 (1): 37-45, 2018.

Selvam, et al., "Performance and emission analysis of DI diesel engine fuelled with methyl esters of beef tallow and diesel blends", Procedia Engineering 38 ( 2012 ) 342-358.

Shakib, et al., "Rice Bran Oil Compared to Atorvastatin for Treatment of Dyslipidemia in Patients with Type 2 Diabetes", Open Access Macedonian Journal of Medical Sciences, Mar. 15, 2014; 2(1):95-102.

Sun, et al., "Effects of different processing methods on the lipid composition of hazelnut oil: a lipidomics analysis", Food Science and Human Wellness, 11 (2022) 427-435.

Vaz Di Mambro Ribeiro, et al., "Fatty acid profile of meat and milk from small ruminants: a review", R. Bras. Zootec., v.40, p. 121-137, 2011 (supl. especial).

Zeng, et al., "Lipid Characteristics of Camellia Seed Oil", J. Oleo Sci. 68, (7) 649-658 (2019).

Zhenggang, et al., "The physicochemical properties and fatty acid composition of two new woody oil resources: Camellia hainanica seed oil and Camellia sinensis seed oil", CYTA—Journal of Food, 2021, vol. 19, No. 1, 208-211, https://doi.org/10.1080/19476337.2021.1879936.

Ediriweera, et al., "Odd-chain fatty acids as novel histone deacetylase 6 (HDAC6) inhibitors", Biochimie 186 (2021) 147-156. (Year: 2021).

Gao, et al., "Isolation and identification of C-19 fatty acids with anti-tumor activity from the spores of Ganoderma lucidum (reishi mushroom)", Fitoterapia 83 (2012) 490-499. (Year: 2012).

Senyilmaz-Tiebe, et al., "Dietary stearic acid regulates mitochondria in vivo in humans", Naturae Communications (2018) 9:3129. (Year: 2018).

(56) References Cited

OTHER PUBLICATIONS

Venn-Watson, et al., "Increased dietary intake of saturated fatty acid heptadecanoic acid (C17:0) associated with decreasing ferritin and alleviated metabolic syndrome in dolphins", PLOS One Jul. 22, 2015. (Year: 2015).

Labarther, et al., "Medium-chain Fatty Acids as Metabolic Therapy in Cardiac Disease", Cardiovase Drugs Ther (2008) 22:97-106, DOI 10.1007/510557-008-6084-0.

* cited by examiner

Carbon chain length

Carbon chain length

Carbon chain length

Carbon chain length

FIGURE 5A

| C chain | EX 1 | EX 2 | EX 3 | EX 4 | EX 5 | EX 6 |
|---------|------|------|------|------|------|------|
| 4 | 0 | 0 | ≤1 | ≤1 | 0 | 0 |
| 5 | 0 | 0 | 0 | ≤1 | 0 | 0 |
| 6 | 0 | 0 | ≤1 | ≤1 | 0 | 7.5 |
| 7 | 0 | 0 | 0 | ≤1 | 2 | 7.5 |
| 8 | 15 | 7.5 | 14 | 7 | 12 | 12.5 |
| 9 | 0 | 7.5 | 0 | 7 | 4 | 12.5 |
| 10 | 25 | 12.5 | 24 | 12 | 20 | 0 |
| 11 | 0 | 12.5 | 0 | 12 | 3 | 0 |
| 12 | 0 | 0 | 0 | 0 | 0 | 25 |
| 13 | 0 | 0 | 0 | 0 | 5 | 25 |
| 14 | 50 | 25 | 49 | 24 | 39 | 5 |
| 15 | 0 | 25 | 0 | 24 | 6 | 5 |
| 16 | 10 | 5 | 9 | 4 | 8 | 0 |
| 17 | 0 | 5 | 0 | 4 | 1 | 0 |
| 18 | 0 | 0 | ≤1 | ≤1 | 0 | 0 |
| 19 | 0 | 0 | 0 | ≤1 | 0 | 0 |
| 20 | 0 | 0 | ≤1 | 0 | 0 | 0 |
| 21 | 0 | 0 | 0 | 0 | 0 | 0 |
| 22 | 0 | 0 | 0 | 0 | 0 | 0 |
| 23 | 0 | 0 | 0 | 0 | 0 | 0 |
| 24 | 0 | 0 | 0 | 0 | 0 | 0 |

FIGURE 7A

| C chain | EX 7 | EX 8 | EX 9 | EX 10 | EX 11 | EX 12 |
|---------|------|------|------|-------|-------|-------|
| 4  | 0  | 0  | 0  | 0  | 0  | 0  |
| 5  | 0  | 0  | 0  | 0  | 0  | 0  |
| 6  | 0  | 0  | 0  | 0  | 0  | 0  |
| 7  | 0  | 0  | 0  | 0  | 0  | 0  |
| 8  | 15 | 10 | 10 | 10 | 10 | 10 |
| 9  | 15 | 10 | 10 | 10 | 10 | 10 |
| 10 | 5  | 5  | 0  | 5  | 0  | 8  |
| 11 | 5  | 5  | 0  | 5  | 0  | 8  |
| 12 | 20 | 20 | 20 | 20 | 20 | 14 |
| 13 | 20 | 20 | 20 | 20 | 20 | 14 |
| 14 | 10 | 15 | 20 | 10 | 10 | 18 |
| 15 | 10 | 15 | 20 | 10 | 10 | 18 |
| 16 | 0  | 0  | 0  | 5  | 10 | 0  |
| 17 | 0  | 0  | 0  | 5  | 10 | 0  |
| 18 | 0  | 0  | 0  | 0  | 0  | 0  |
| 19 | 0  | 0  | 0  | 0  | 0  | 0  |
| 20 | 0  | 0  | 0  | 0  | 0  | 0  |
| 21 | 0  | 0  | 0  | 0  | 0  | 0  |
| 22 | 0  | 0  | 0  | 0  | 0  | 0  |
| 23 | 0  | 0  | 0  | 0  | 0  | 0  |
| 24 | 0  | 0  | 0  | 0  | 0  | 0  |

FIGURE 7B

| C chain | EX 13 | EX 14 | EX 15 | EX 16 | EX 17 |
|---------|-------|-------|-------|-------|-------|
| 4 | 0 | 0 | 0 | 0 | 0 |
| 5 | 0 | 0 | 0 | 0 | 0 |
| 6 | 0 | 0 | 0 | 0 | 0 |
| 7 | 0 | 0 | 0 | 0 | 0 |
| 8 | 10 | 10 | 10 | 10 | 12.5 |
| 9 | 10 | 10 | 10 | 0 | 0 |
| 10 | 20 | 5 | 0 | 25 | 25 |
| 11 | 20 | 5 | 0 | 0 | 0 |
| 12 | 0 | 15 | 15 | 30 | 30 |
| 13 | 0 | 15 | 15 | 0 | 0 |
| 14 | 20 | 20 | 15 | 0 | 2.5 |
| 15 | 20 | 20 | 15 | 0 | 0 |
| 16 | 0 | 0 | 10 | 35 | 30 |
| 17 | 0 | 0 | 10 | 0 | 0 |
| 18 | 0 | 0 | 0 | 0 | 0 |
| 19 | 0 | 0 | 0 | 0 | 0 |
| 20 | 0 | 0 | 0 | 0 | 0 |
| 21 | 0 | 0 | 0 | 0 | 0 |
| 22 | 0 | 0 | 0 | 0 | 0 |
| 23 | 0 | 0 | 0 | 0 | 0 |
| 24 | 0 | 0 | 0 | 0 | 0 |

FIGURE 7C

MILKFAT OR BUTTERFAT FORMULATIONS

CROSS-REFERENCE TO RELATED APPLICATIONS

This application claims the benefit of U.S. Provisional Application No. 63/443,296, filed 3 Feb. 2023, and U.S. Provisional Application No. 63/450,587, filed 7 Mar. 2023, each of which are incorporated in its entirety by this reference.

TECHNICAL FIELD

This invention relates generally to the substitute fat field, and more specifically to a new and useful system and method in the substitute fat field.

BRIEF DESCRIPTION OF THE FIGURES

FIG. 5A are exemplary triglycerides that can be formed by estification of caprylic acid, capric acid, and palmitic acid with glycerol. In this example, enantiomers of some triglycerides can be present (but are not explicitly listed).

FIGS. 7A-7C are a tabular representation of exemplary milk fat or butter fat formulations.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. OVERVIEW

Figure 1:
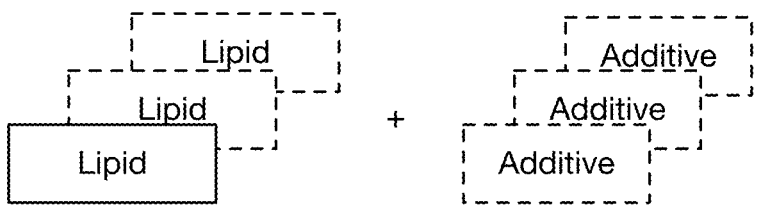
FIG. 1 is a schematic representation of a fat formulation.

As shown in FIG. 1, the fat formulation can include one or more lipids and optionally one or more additives. The fat formulation can be, for instance, an agriculture-free (e.g., does not include materials derived from agricultural products), an agriculture light (e.g., less than about 10% mass of the composition can be derived from agricultural products), animal-free (e.g., does not include materials derived from animal products or byproducts, animal light (e.g., less than about 10% mass of the composition can be derived from animal produced materials), and/or any suitable fat formulation.

The fat formulation can be used, for example, as a substitute or artificial fat in food products (e.g., as a fat source in plant based products such as a fat included in a plant-based yogurt, plant-based cheese, etc.), a baking or cooking oil (e.g., fat for baked goods, confections, chocolate, etc.), sauces (e.g., dips, dressings, condiments, etc.), emulsifier, infant formula supplement, creamer (e.g., coffee creamer, coffee cream), whipped dessert toppings, margarine, filled milk (or products derived therefrom), in dairy products or lacticinia (e.g., in addition to or as a substitute for animal-derived butterfat or milkfat in ayran, butter, buttermilk, cheese, cream, curd, ice cream, ice milk, filmjölk, kefir, kumis, milkshake, skyr, whey, ymer, yogurt, sour cream, schmand, creme fraiche, half and half, table cream, whipping cream, double cream, heavy cream, clotted cream, powdered milk, condensed milk, evaporated milk, baked milk, dulce de leche, malai, khoa, smetana, kaymak, ghee, smen, clabber, viili, amasi, aarts, basundi, bhuna, bland, booza, borhani, koldskal, tzatziki, eggnog, caudle, chaas, chal, chalap, chass, mursik, cuajada, curd, dadiah, daigo, dondurma, gombe, gomme, haymilk, junket, junnu, kalvdans, kashk, aaruul, chortan, qurut, podmleč, pomazánkové, pytia, acidophiline, matzoon, míša, mitha dahi, mozzarella, qatyq, qimiq, quark, ryazhenka, sarasson, semifreddo, sergem, shrikhand, skroup, so, spaghettieis, súrmjólk, siitlag, tarhana, tuttis, tvorog, uunijuusto, varenets, vla, yakult, yayik ayrani, žinčica, crema, doogh, lassi, leben, rennet-coagulated cheeses, acid-set or sour milk cheeses, whey cheese, cottage cheese, blue cheese, green cheese, pasta filata, processed cheese, smear-ripened cheese, smoked cheese, washed-rind cheese, cream cheese, custard, gelato, whipped cream, etc.), and/or can be used for any suitable purpose. The fat formulation is preferably a food grade (e.g., generally recognized as safe (GRAS) for consumption) fat replacement for milkfat or butterfat (e.g., cow milk, goat milk, sheep or ewe milk, yak milk, buffalo milk, water buffalo milk, human milk, horse milk, donkey milk, camel milk, elk milk, musk ox milk, alpaca milk, llama milk, antelope milk, baboon milk, chimpanzee milk, coyote milk, dolphin milk, fox milk, giraffe milk, guinea pig milk, kangaroo milk, mink milk, monkey milk, mouse milk, opossum milk, rabbit milk, rat milk, sea lion milk, seal milk, zebra milk, bear milk, cat milk, dog milk, elephant milk, porpoise milk, reindeer milk, pig milk, whale milk, moose milk, etc. such as for milk, cream, hard cheese, soft cheese, spreadable cheese, melting cheese, processed cheese, vegan cheese, paneer, ghee, clarified butter, infant food supplement, infant formula supplement, breastmilk substitute, colostrum substitute, powdered milk, evaporated milk, condensed milk, milk products, used as a fat in a plant-based dairy product equivalent such as for a plant-based dairy product of the above, etc.). However, the fat formulation may not be food grade (e.g., when the fat formulation is used for livestock).

The fat formulation can be the same or different to account for differences between (e.g., to better mimic) grassfed, grain fed, corn fed, seasonal, and/or to mimic dairy fats for animals with any suitable type of feed. Relatedly, the fat formulation can be the same or different to account for differences based on the animal and/or animal breed (and/or species or subspecies) that the dairyfat, milkfat, or butterfat mimics (e.g., acts as a functional analogue for). For example, a grass-fed as compared to a non-grass-fed milkfat formulation are generally substantially the same such as varying by less than about 10% (e.g., any fatty acids represented in one formulation will differ by at most about 10% in the other formulation such as if a fatty acid is about 10% of a formulation, the modified formulation will likely have 9-11% of the fatty acid). However, substantial differences and/or completely different formulations can be formed for the different dairy fats. Similarly, substantially the same formulation can be used for dairy fat (e.g., liquid milk), butter fat (e.g., solid butter), yogurt fat, cheese fat, and/or other dairy fat applications (e.g., any suitable lacticinia). However, different formulations may be developed for different dairy fat applications (e.g., artisan cheeses, different fat-percentage milks, etc.).

2. BENEFITS

Variations of the technology can confer several benefits and/or advantages.

First, variants of the technology can enable lower carbon footprint and/or carbon impact fats to be used. For instance, by using lipids (e.g., free fatty acids, esterified fatty acids, glycerolipids, etc.) derived from low or negative carbon footprint processes (e.g., processes that capture, trap, etc. carbon and convert the carbon to fatty acids, fatty esters, etc.), a low carbon footprint fat can be produced. In some aspects of the invention, a carbon footprint to produce a fat formulation can be less than a carbon footprint for an identical or analogous fat derived from agricultural processes. In some variations of the invention, by using odd chain length fatty acids (in addition to or alternatively from) even chain length fatty acids can help lower a carbon footprint of the formulation (e.g., by reducing a total number of processing steps to prepare the fatty acids, by reducing an amount of waste, etc.).

Second, variants of the technology can produce performant fat formulations that accurately, convincingly, and/or otherwise mimic properties of a fat to be replicated. For example, the fat formulations can have a similar mouthfeel, texture, melting point, smoke point, taste, hardness, brittleness, spreadability, graininess, oiliness, stickiness, temperature-dependent viscosity, aeration, and/or other suitable property(s) compared to the fat to be replicated. In some variations, using a gapped formulation (e.g., using a combination of fatty acids where at least one intermediate carbon chain length is absent or nearly absent such as at most a 20% prevalence relative to target carbon chain lengths, etc.) can enable and/or be beneficial for achieving complex formulation behavior (e.g., more able to mimic a behavior of a fat to be replicated).

Third, the inventors have identified that using plant-based fats (such as coconut oil, formulations combining plant fats, etc.) to replace, mimic, simulate, and/or otherwise act as an animal fat can provide poor performance (e.g., inauthentic mouthfeel, inauthentic texture, inauthentic melting behavior, inauthentic flavor, etc.). The inventors have found that formulations using saturated fats can, in some variants, produce more performant (e.g., more convincing, closer to the original, etc.) fat replicas than plant-based oils.

However, variants of the technology can confer any other suitable benefits and/or advantages.

3. FAT FORMULATION

As shown in FIG. 1, the fat formulation can include one or more lipids and optionally one or more additives. The fat formulation can be, for instance, an agriculture-free (e.g., does not include materials derived from agricultural products), an agriculture light (e.g., less than about 10% mass of the composition can be derived from agricultural products), animal-free (e.g., does not include materials derived from animal products or byproducts), animal light (e.g., less than about 10% mass of the composition can be derived from animal produced materials), and/or any suitable fat formulation.

The composition of the fat formulation (e.g., the fatty acid composition such as the chain lengths, relative amounts of each fatty acid chain length, etc.; the additive composition such as types of additives, number of additives, additive concentration, etc.) can be selected based on a target fat profile and/or fat property. Examples of fat properties to achieve can include: thermodynamic behavior (e.g., melting point, melting profile, smoke point, enthalpy of melting, crystallization point, crystallization profile, crystallization phase, etc.), rheological behavior (e.g., slip point, viscosity, plasticity, consistency, flow, etc.), organoleptic behavior (e.g., taste, smell, feel, sound, appearance, color, mouth feel, etc.), optical properties (e.g., transparency, translucency, light scattering, color, refractive index, transmittance, reflectance, turbidity, birefringence, etc.), phase separation behavior (e.g., phase stability, ability to phase separate such as to form layers, etc.), emulsifying properties (e.g., surface tension, aeration, foaming, coalescence, avalanche, coarsening, foam drainage, dewetting, bursting, flocculation, creaming, sedimentation, Ostwald ripening, etc.), nutritional content (e.g., calorie content, fatty acid composition, etc.), foam structure (e.g., open cell foam, closed cell foam, cellular structures, etc.), pharmacological behavior (e.g., laxative effect, constipating effect, etc.), and/or any suitable property(s).

Figure 3A:
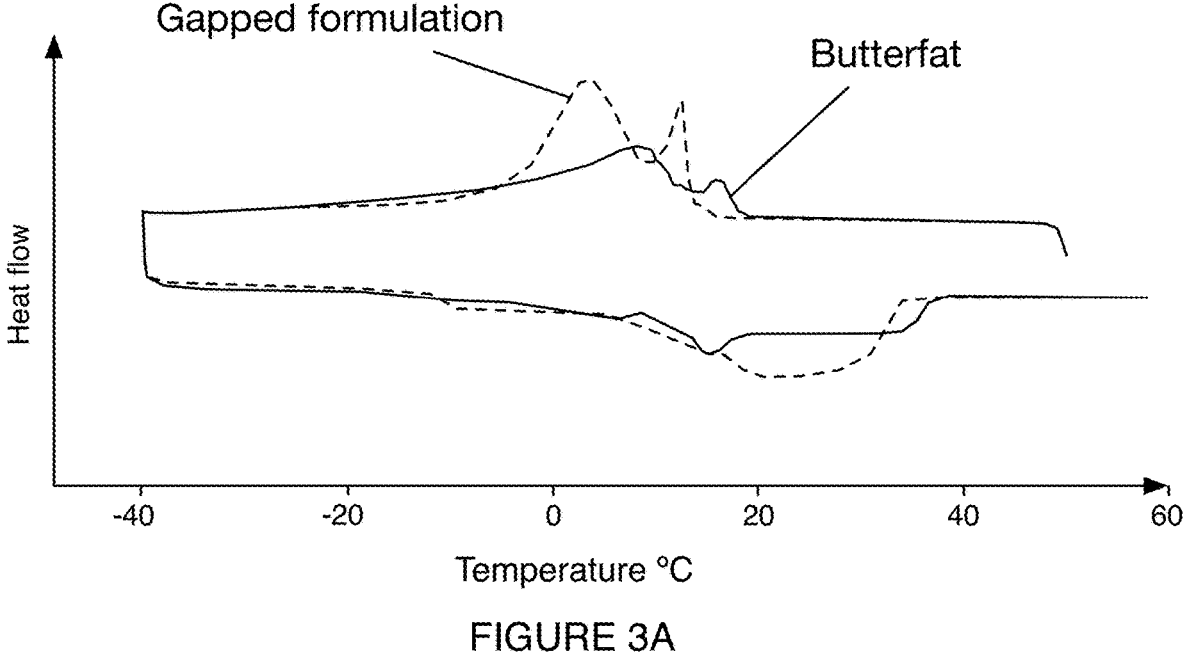
FIGS. 3A and 3B are schematic representations of example thermal behavior of a representative butterfat and a representative gapped fat formulation.
Figure 3B:
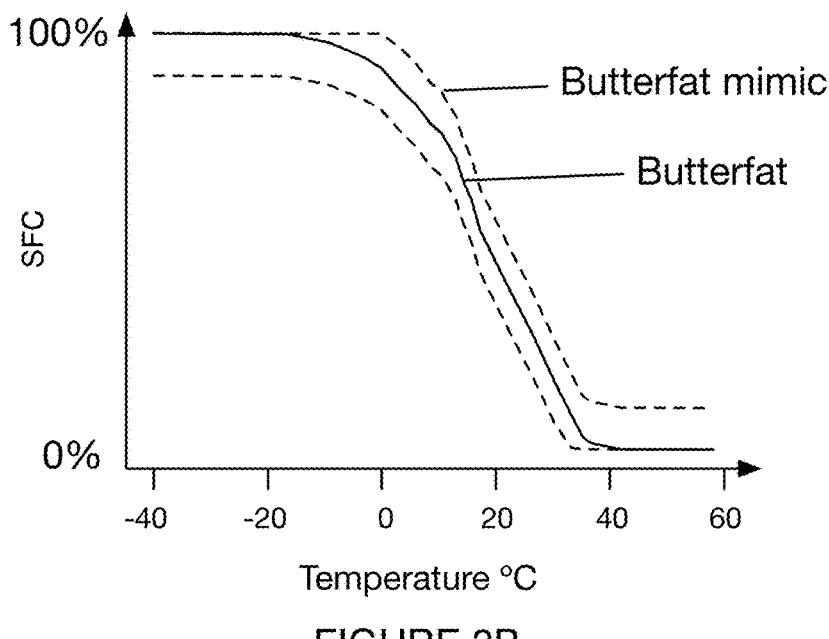
Figure 8:
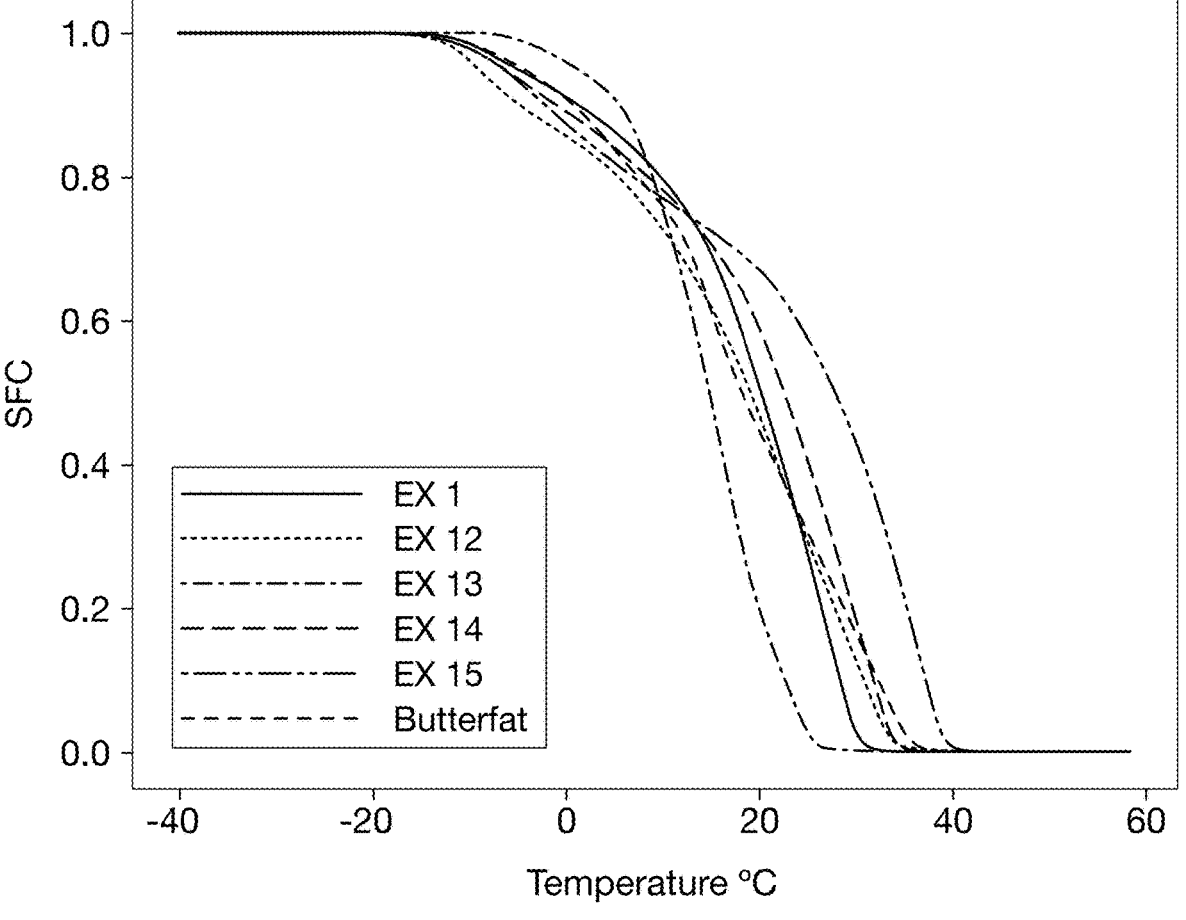
FIG. 8 is a graphical representation of solid fat content (SFC) curves for exemplary milkfat formulations from FIGS. 7A-7C as compared to the SFC curves for butter.

In a first variant, the thermal behavior and/or properties of the fat formulation (and/or constituents thereof such as lipids, fats, triglycerides, etc.) can be particularly important. For instance, as shown for example in FIG. 3A, FIG. 3B, and/or FIG. 8, a fat formulation can be derived to mimic a melting profile of a dairy fat. As another example, as shown for example in FIG. 4, a fat formulation composition can be determined to achieve a target solid fat content as a function of temperature (e.g., derived from differential scanning calorimetry measurement, nuclear magnetic resonance, an SFC analyzer, dilatometry, etc.) mimicking the solid fat content as a function of temperature of a dairy fat. In a variation of this example, the solid fat content of the formulation composition is preferably within about 0.1 (10%) of the solid fat content of the target dairy fat over a span of temperatures (e.g., across room temperature, refrigeration temperatures, freezing temperatures, cryogenic temperatures, 0°-40° C., 10° C.-20° C., 5° C.-15° C., −20° C.-50° C., −20° C.-5° C., 20-40° C., 20-30° C., 25-50° C., ranges or values contained therein, etc.). In a second variation (which can be combined with the first variation) of this example, the solid fat content of the formulation is preferably about 0 (e.g., between 0 and 0.01) at a temperature less than (e.g., lower by 0.5° C., 1° C., 1.5° C., 2° C., 2.5° C., 5° C., values or range therebetween, etc.) or equal to the temperature at which the solid fat content of the dairy fat to be mimicked is about 0; i.e., the melting temperature of the fat formulation is within the threshold temperature of the melting temperature of the dairy fat (e.g., a melting temperature of the fat formulation is between about 28° C. and about 35° C.). In a third variation (which can be combined with the first variation) of this example, the solid fat content of the formulation is preferably about 100 (e.g., between 0.99 and 100) at a temperature that differs from a temperature at which the solid fat content of the dairy fat to be mimicked is about 100 by at most about 2.5° C. (e.g., 0° C., 0.5° C., 1° C., 1.5° C., 2° C., etc.); i.e., the onset of melting of the fat formulation is within about 2.5° C. of the onset of melting of the dairy fat. In a fourth variation (which can be combined with the first variation) of this example, the solid fat content of the formulation is preferably equal to the solid fat content of the dairy fat to be mimicked at a temperature within about 5° C. (e.g., 0° C., 0.5° C., 1° C., 1.5° C., 2° C., 3° C., 4° C., 5° C., values or ranges therebetween, etc.) for all solid fat contents. In related variations, a solid fat index (e.g., volume or density change observed in the fat as a function of temperature) can be measured and/or used (e.g., instead of or in addition to solid fat content). In a second variant, the mechanical behavior (e.g., texture, softness, hardness, spreadability, mouthfeel, etc.) of the fat formulation (and/or constituents thereof such as lipids, fats, triglycerides, etc.) can be particularly important. In the second variant, the mechanical behavior can be characterized for a single temperature, a plurality of discrete temperatures, and/or a range of temperatures (where the formulation composition can be tuned to mimic the mechanical behavior of the dairy fat at the single temperature, plurality of discrete temperatures, and/or the range of temperature). In the second variant, the mechanical behavior can be characterized by a trained analyst (e.g., tester), using a texture analyzer, using a durometer, and/or can be characterized in any suitable manner. In a third variant, the flavor of the fat formulation (and/or constituents thereof such as lipids, fats, triglycerides, etc.) can be particularly important. In the third variant, the flavor can be analyzed using a trained analyst (e.g., taste tester, taster, etc.), using flavor or off-flavor analyzers (e.g., gas chromatography mass spectrometry, near-infrared spectrometry, high-performance liquid chromatography mass spectrometry, ion mobility mass spectrometry, time-of-flight mass spectrometry, particle size analyzer, ultraviolet spectroscopy, infrared spectroscopy, gas chromatography flame ionization detection, etc.), and/or can be analyzed in any manner; where the analysis can result in tasting notes, a tasting score (e.g., scoring how close the taste of the formulation is to the taste of the target dairy fat), and/or can result in any suitable result. In a fourth variant, the preceding three variants can be combined in any manner (e.g., first and second variant; first and third variant; second and third variant; first, second, and third variant), where different variants can be given the same and/or different weights in determining and/or generating the fat formulation. In the preceding variants, the quality of match (e.g., selection between potential formulations, formulation composition) between the target property and the property of the dairy fat can be characterized based on an absolute difference between, least squares difference, weighted least squares difference, goodness of fit, and/or other suitable metric comparing the property of the dairy fat and the property of the fat formulation. However, in other variants, one or more additional properties (e.g., as described above) can be of particular importance.

The fat formulation preferably predominantly includes lipids. For example, at least about 95% (e.g., 94.5%, 94.9%, 95.5%, 96%, 97%, 98%, 99%, 99.5%, 99.9%, 99.95%, 99.99%, 99.995%, 99.999%, 100%, etc. such as by mass, by volume, by stoichiometry, etc.) of the fat formulation can be lipids (including or excluding glycerol for the formation of triglycerides and other glycerolipids). However, in some variants, the fat formulation can include up to about 5% (e.g., by mass, by volume, by stoichiometry, etc.) of each additive (e.g., a fat formulation that is about 5% a first additive, about 5% a second additive, and about 90% lipid), a fat formulation can include more than about 5% of one or more additive (e.g., 6%, 7%, 8%, 10%, 15%, etc.), and/or the fat formulation can have any suitable composition.

The fat formulation can optionally include a solvent. The lipid(s) and/or the additive(s) can be dissolved in the solvent, suspended in the solvent (e.g., form a colloidal solution, form an emulsion, form a miniemulsion, etc. where the solvent can form droplets, act as the continuous phase, act as the dispersion medium, etc.), phase separate from the solvent, and/or can otherwise be mixed and/or separated. Exemplary solvents include water or glycerol; however, any suitable solvent (e.g., ethanol, etc.) can be used.

The lipids are preferably derived from a chemical process (e.g., oxidation of paraffins, from captured carbon dioxide, from natural gas, from carbon monoxide, from syngas, from coal, from biomass, from a Fischer-Tropsch synthesis, from a Ziegler-method synthesis, artificial fatty acids, etc.), but can additionally or alternatively be cultured (e.g., produced via cells), derived from biological processes (e.g., fatty acids obtained from plants, fungi, microbes, animals, etc.), and/or can otherwise be obtained or derived.

The lipids preferably include fatty acids with a chain length between 4 and 24 carbons long. However, shorter fatty acids (or short chain carboxylic acids), longer fatty acids (e.g., 25, 26, 27, 28, 29, 30, 40, values therebetween, etc. carbon atoms long), and/or other lipids can be included in the fat formulation. In preferred examples, the lipid composition of the fat formulation is preferably less than about 10% (e.g., by mass, by volume, by stoichiometry, etc. where the approximate can exclude the mass contribution of glycerol or other alcohols used to form fatty esters, can account for batch to batch variations of about 0.5% such as to account for a range of 9.5-10.5%, etc.) short chain carboxylic acids (e.g., carboxylic acids with chain lengths less than 8 carbon atoms). In related examples, the lipid composition is less than about 5% (e.g., by mass, by volume, by stoichiometry, etc. where the approximate can exclude the mass contribution of glycerol or other alcohols used to form fatty esters, can account for batch to batch variations of about 0.5% such as to account for a range of 4.5-5.5%, etc.) longer chain carboxylic acids (e.g., carboxylic acids with chain lengths greater than 18 carbon atoms). However, the lipid composition can include any suitable amount of short and/or long chain fatty acids (e.g., to make a softer and/or harder fat formulation respectively).

The fatty acids are preferably saturated fatty acids, but can include unsaturated fatty acids (e.g., aromatic fatty acids, cyclic fatty acids, including double or triple bonds, etc.). The fatty acids are preferably linear (e.g., straight-chain, unbranched, etc.), but can additionally or alternatively be nonlinear (e.g., branched, cyclic, etc.). In a specific example, the lipids of the fat formulation can consist essentially of (e.g., be composed of, be composed essentially of, consist of, include only, have a sufficient amount of such that one or more fat formulation properties are changed by less than 20% of a target property, etc.) linear fatty acids (e.g., >90% linear, >95% linear, >98% linear, >99% linear, >99.9% linear, >99.99% linear, etc.; linear fatty acids; etc.). As a second specific example, the lipids of the fat formulation can consist of linear fatty acids. However, the fat formulation (and/or lipids thereof) can include any suitable fatty acids (e.g., a fat formulation that includes unsaturated fatty acids).

The fat formulation preferably includes a nonmonotonically increasing distribution of fatty acids (e.g., fraction of fatty acid) from short-chain fatty acids to long-chain fatty acids (or analogously a non-monotonically decreasing distribution of fatty acids from long-chain fatty acids to short-chain fatty acids). The inclusion of a nonmonotonically increasing distribution can be beneficial for achieving complex thermal behavior in the fat composition (e.g., plateaus in the solid fat composition such as regions with zero or near-zero such as <0.03 slope between two adjacent regions with non-zero slope, broad peaks in heat flow measurements, multiple peaks in heat flow measurements, etc.). Additionally, or alternatively, the nonmonotonically increasing distribution can be beneficial for utilization of fatty acids derived from an as-synthesized distribution and/or can provide any suitable technical advantage. Within the distributions, fatty acids are generally considered as a pair (e.g., an even and odd pair where the pair refers to an even chain length and the odd chain length fatty acid with one more carbon atom, an even and odd pair where a melting point of the even chain fatty acid and odd chain fatty acid differ by less than about 2° C., etc.). As such, even-only and/or odd-only formulations are generally not considered nonmonotonically increasing distributions (unless they also have a nonmonotonically increasing distribution of fatty acids from short-chain to long-chain fatty acids of the fatty acids).

Figure 2:
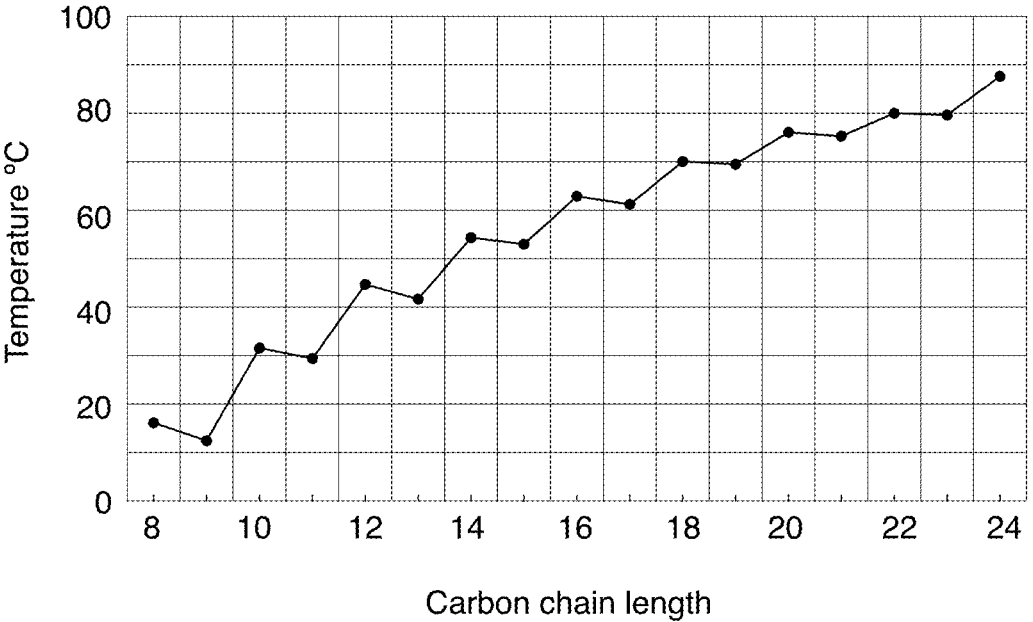
FIG. 2 is a chart of approximate fatty acid melting points as a function of chain length.

As a first illustrative example of a nonmonotonically increasing distribution, the distribution can include a gap in the fatty acids of the formulation. A gap preferably refers to one or more missing even and/or even and odd pair (where even and odd pair generally, but not exclusively, refers to an even fatty acid and a fatty acid with one more carbon atom than the even fatty acid; refers to fatty acids with similar melting points as shown for example in FIG. 2; etc.) of fatty acids from the fat formulation. As an illustrative example, a fat formulation that includes fatty acids with C8-C10 and C14-C16 fatty acids would be a gapped formulation as C12 and C13 are not in the fat formulation. As a contrasting illustrative example, a fat formulation that includes fatty acids with C6, C8, C10, C12, and C14 would typically not be considered a gapped formulation (despite excluding odd chain length fatty acids). An example of an even-only (or analogously odd-only) gapped formulation would be a fat formulation that includes (e.g., consists of, consists essentially of, includes only, is composed of, is composed essentially of, etc.) C6, C8, C12, C14, and C16 fatty acids. The gap can be beneficial for enabling or leading to complex behavior (e.g., broad melting profile, multiple peaks in a melting profile, as shown for example in FIG. 3A or FIG. 3B, etc.) in the behavior of the fat formulation. However, a gapped formulation can otherwise be beneficial and/or can otherwise be defined.

Figure 4A:
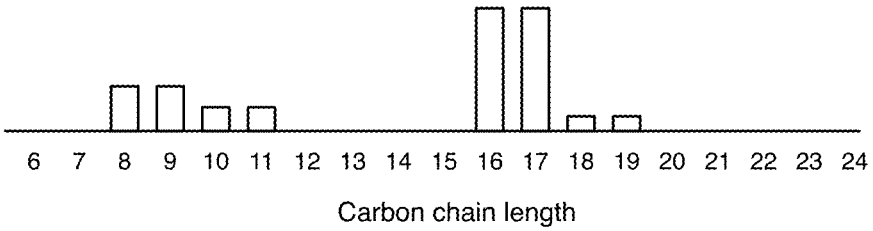
FIGS. 4A-4C are schematic representations of exemplary relative fatty acid chain lengths for a gapped fat formulation, a gapped fat formulation, and a gapped even-only fat formulation respectively.
Figure 4B:
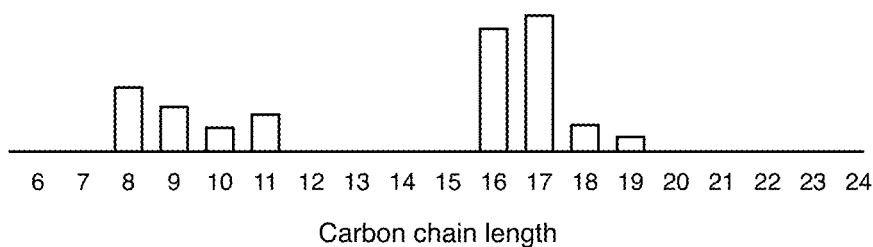
Figure 4C:
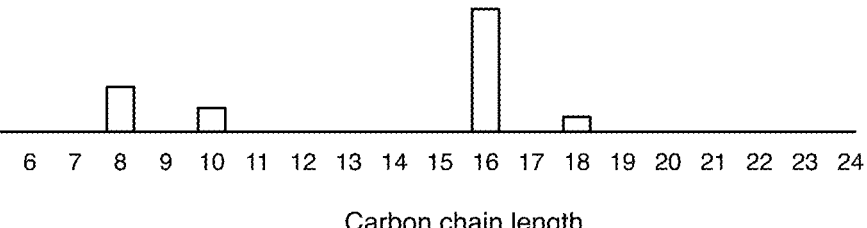

A fat formulation can include a single gap (e.g., be missing a single even carbon or even and odd pair carbon chain; as shown for example in FIG. 4A, FIG. 4B, or FIG. 4C; etc.) and/or can include a plurality of gaps (e.g., 2 gaps, 3 gaps, 4 gaps, etc.). As an illustrative example, a multigap formulation could include C8, C9, C12, C13, C16, C17, C20, C21, C22, and/or C23 (where C # refers to a fatty acid with the # of carbon atoms of fatty acids). However, any suitable multigap formulation can be used.

As a second illustrative example of a nonmonotonically increasing distribution, the distribution of fatty acids can include a peak-and-valley in the fatty acids included in the formulation. Alternatively phrased, a nonmonotonically increasing distribution can include two or more local maxima in the concentration of fatty acids with respect to chain length with one or more local concentration minima with respect to chain length between two local maxima. For example, a fat composition that included 20% C8/C9, 10% C10/C11, 30% C12/C13, and 40% C14/C15 would be a peak-and-valley distribution as C8/C9 and C14/C15 are each local maxima with the local minimum of C10/C11 in between, where the percentages can refer to percent mass, percent volume, stoichiometric percent, and/or other suitable percent and can be distributed in any manner between $C_n$ and $C_{n+1}$ (e.g., 20% C8/C9 can include anywhere between 0-20% C8 and 0-20% C9 where the total adds to 20%). However, any suitable percentages of fatty acids can be included to achieve a peak-and-valley distribution.

As a third illustrative example of a nonmonotonically increasing distribution, the distribution of fatty acids can include a plateau in the fatty acids included in the formulation over at least two pairs of fatty acid chain lengths. For example, a fat composition that included 15% C8/C9, 15% C10/C11, 30% C12/C13, and 40% C14/C15 would be a plateaued distribution as C8/C9 and C10/C11 are adjacent and contribute the same amount to the fat composition, where the percentages can refer to percent mass, percent volume, stoichiometric percent, and/or other suitable percent and can be distributed in any manner between $C_n$ and $C_{n+1}$ (e.g., 15% C8/C9 can include anywhere between 0-15% C8 and 0-15% C9 where the total adds to 15%). However, any suitable percentages of fatty acids can be included to achieve a plateaued distribution.

However, other suitable non-monotonically increasing distributions can be used.

In some variants (as shown for example in the first and third example fat formulations in FIG. 7A), the fat formulation can include only even chain length fatty acids. These variants can be beneficial as even chain length fatty acids are generally recognized as safe to consume and/or can otherwise be beneficial. In other variants (as shown for example in the second, fourth, and fifth examples fat formulation in FIG. 7A), the fat formulation can include even and odd chain length fatty acids. These variants can be beneficial for producing less waste, requiring less processing (e.g., fewer separations, less fractionation, etc.), and/or can otherwise be beneficial. In other variants, the fat formulation could include only odd chain length fatty acids, which may be beneficial for using materials remaining from other fat formulations (e.g., using separated fatty acids from an even-only chain formulation) or for providing metabolically advantageous properties (e.g., anti-inflammatory, anticarcinogenic, antioxidant, antibiotic, non-cytotoxic immunosuppressive, glucogenic, etc.; have an inverse relationship with disease development for: atherosclerosis, prediabetes and type II diabetes, coronary heart disease, insulin sensitivity, etc.; etc.) to food products. However, the fat formulation can include any suitable fatty acid(s).

In some variants, fatty acids and/or the distribution of fatty acids can be modified based on an atherogenicity of individual fatty acids. For instance, fat formulations can include (e.g., predominantly, plurality, majority, etc. include) saturated fatty acids with chain lengths at most 11 carbon chains long and/or at least 18 carbon chains long (or other fatty acids that are considered nonatherogenic). Similarly, fat formulations that include fatty acids with between 12 and 17 carbon atoms (which may be atherogenic or other potentially atherogenic fatty acids) can try to optimize the relative amount of C12-C17 fatty acids relative to other fatty acids to mitigate an overall atherogenicity of the fat formulation.

The lipids can include free fatty acids, fatty acid esters (e.g., mono glycerides such as 1-glycerides, 2-glycerides; diglycerides such as 1,2-glycerides, 1,3 glycerides; triglycerides, triacylglycerides, triacylglycerol, etc.; etc.), and/or any suitable lipids. In a first specific example, the lipids can consist essentially of (e.g., be composed of, include only, be composed essentially of, have a sufficient amount of such that one or more fat formulation properties are changed by less than 20% of a target property, etc.) triglycerides. In a second specific example, the lipids can include a mixture of diglycerides and triglycerides. In the second specific example, the diglycerides can be beneficial for forming emulsions of the fat formulation (e.g., in water, solvent, etc.), can be beneficial for modifying and/or controlling mechanical properties of the fat formulation, and/or can provide any suitable technical advantage. In the second specific example, the triglycerides are preferably at least about 80% (e.g., 85%, 90%, 95%, 97%, 98%, 99%, 99.5%, 99.9%, etc. where percentage can refer to mass percent, volume percent, stoichiometric percent, composition percent, etc.) of the lipid composition. Variants of the second specific example can include monoglycerides (preferably, but not necessarily, substituting for or replacing a portion of the diglyceride composition without modifying the triglyceride composition) and/or replace the diglycerides with monoglycerides. However, the lipids can include any suitable esters.

Figure 5A:
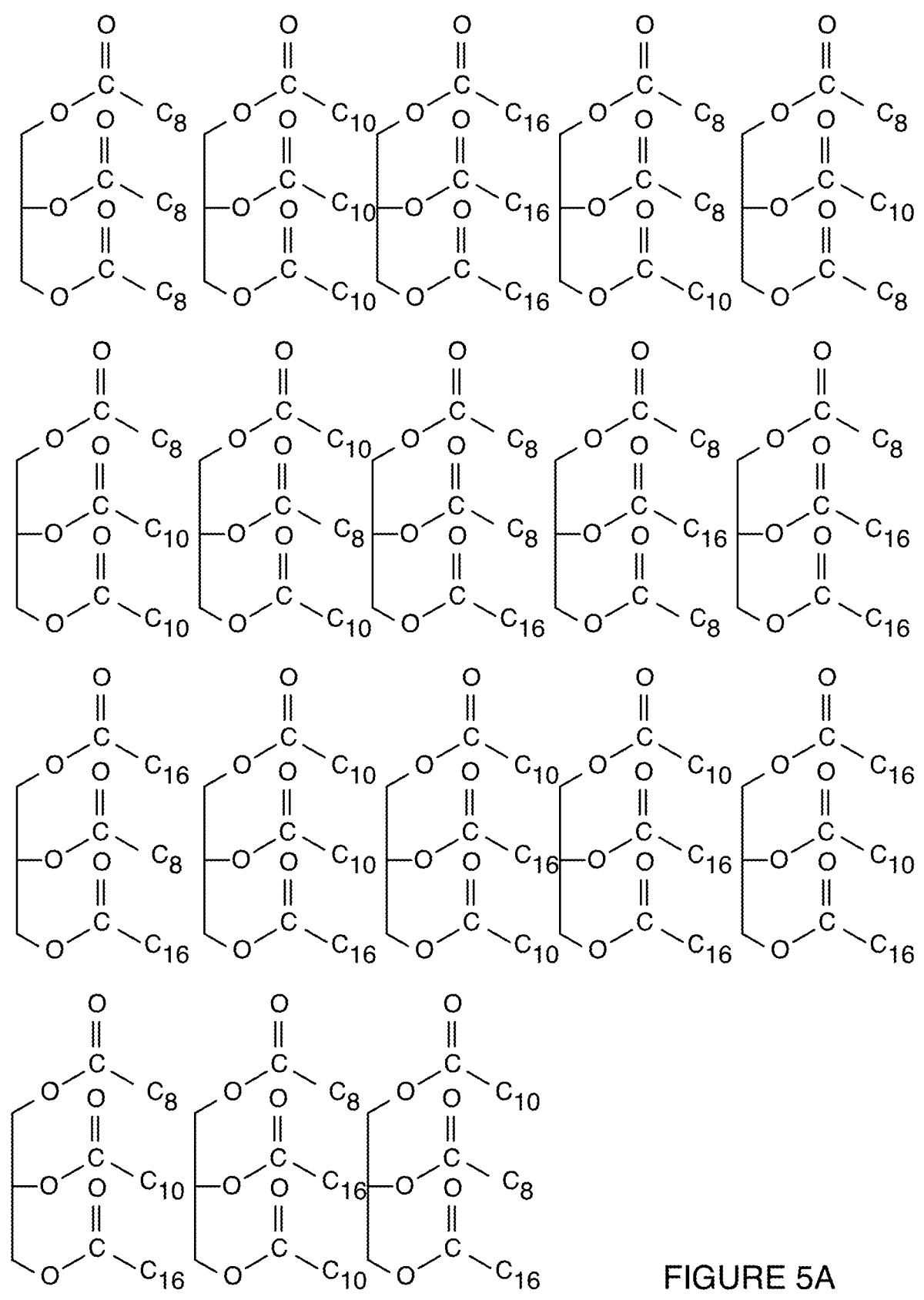
Figure 5B:
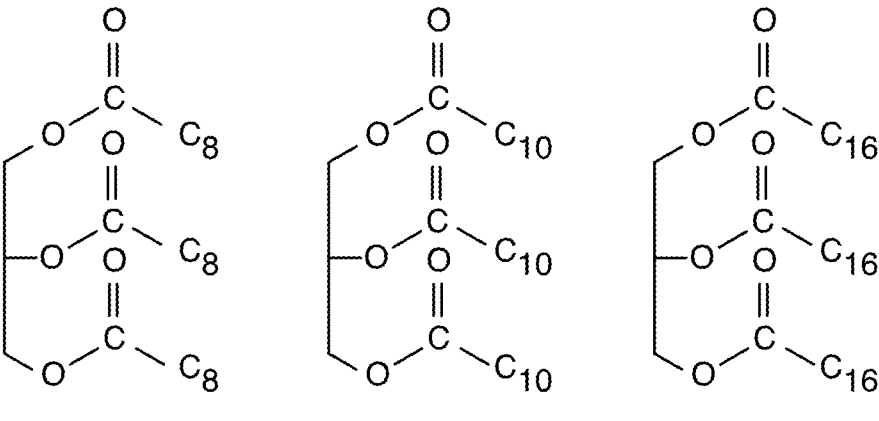
FIG. 5B are exemplary triglycerides that can be used in a fat formulation of tricaprylin, tricaprin, and tripalmitin that are physically mixed (e.g., after the esters have been formed).

When the lipids include esters (particularly but not exclusively triglycerides, esters of glycerol, etc.), the fatty acids of the esters can be interesterified (e.g., form heteroesters, as shown for example in FIG. 5A, chemically mixed as free fatty acids before esterification of the free fatty acids with glycerol, mixing homo-triglycerides including the fatty acids where the homo-triglycerides are reacted together to form heterotriglycerides, etc.) and/or can be intraesterified (e.g., form homoesters, as shown for example in FIG. 5B, physically mixing homotriglycerides, etc.). For instance, to form an interesterified formulation, free fatty acids (e.g., according to a distribution of free fatty acids) can be mixed and esterified simultaneously. In some variants, a first set of free fatty acids can be mixed and partially esterified (such as to form mono or diglycerides), where the partially esterified fatty acids can then be esterified with a second set of fatty acids to form the triglycerides (or diglycerides). In these variants, the second set of fatty acids can include longer-chain fatty acids than the first set of fatty acids and preferably occupy the sn-3-position or sn-1-position of glycerol, but can additionally or alternatively occupy any suitable position (e.g., sn-2-position) of the glycerol and/or include shorter and/or comparable chain lengths to the first set of fatty acids. As another example (particularly, but not exclusively, beneficial for human breastmilk applications such as to behave as a human breast milk functional analogue; to be included in infant formula, artificial breastmilk, supplement in breastmilk, etc.; etc.) triglycerides can be formed with palmitic acid preferentially occupying the sn-2-position of the triglyceride (e.g., about 90% of palmitic acid of the fat formulation can be in the sn-2-position, about 90% of triglycerides can include palmitic acid in the sn-2-position, etc.). Similarly, to form an intraesterified fat formulation, free fatty acids can be separately esterified, and the esters can be mixed. However, the esters can otherwise be formed.

In some variants, different subsets of the fatty acids can form heteroglycerides, where each subset of heteroglycerides is physically mixed to form the fat formulation. As a specific example, fatty acids with chain lengths less than a gap length can form heteroglycerides together and fatty acids with chain lengths greater than a gap length can form heteroglycerides together. In another specific example, a first fatty acid with a chain length less than the gap chain length can form heteroglycerides with a second fatty acid with a chain length greater than the gap chain length.

In variants that include different esters (e.g., a mixture of monoglyerides, diglycerides, and/or triglycerides), the free fatty acids contained therein are preferably intermixed. For example, when a composition includes C8, C10, C14, and C16 the monoglycerides, diglycerides, and/or triglycerides preferably each have the same approximate distribution of individual fatty acids. In some variations of this specific example, a different distribution of fatty acids can occur in monoglycerides and/or diglycerides relative to triglycerides. In an illustrative variation, if a 50:50 mixture of C6:0 and C16:0 are esterified, after processing the fat formulation would include triglycerides of a mixture of C6,C6,C6; C6,C16,C6; C6,C6,C16; C6,C16,C16; C16,C6,C16; and C16,C16,C16 in an approximate ratio (e.g., mass ratio, stoichiometric ratio, etc.) of 1:1:2:2:1:1 whereas the diglycerides would predominantly include C16,C16 with less (i.e., less than twice the amount of C16,C16) C6,C16 and approximately no C6,C6. However, in some examples, different fatty acids can be incorporated into different esters (e.g., fatty acids of the esters are not intermixed between different esters). For instance, a lipid composition could include C14 mono- and/or diglycerides and C8, C10, and C16 triglycerides (e.g., as shown for example in FIG. 5A or FIG. 5B). As another example, butyric acid can be included (e.g., as an additive) as the free fatty acid. However, the composition can include any suitable combination or composition of esters.

The hydroxyl number (e.g., the number of milligrams of potassium hydroxide required to neutralize acetic acid taken up on acetylation of one gram of a chemical substance that contains free hydroxyl groups which can be a value for approximate monoglyceride and/or diglyceride concentration of the formulation) of the fat formulation is preferably less than about 30 (e.g., 0-30, 0-5, 0-10, 0-20, 1-5, 5-10, 5-20, 10-20, 15-30, 20-30, values or ranges therebetween), but can have any suitable value. In variations, the hydroxyl number can be determined according to a method as described in ASTM E1899, EN 15168, ASTM D1957, ASTM E222-10, and/or in any suitable manner.

The additives can function to modify one or more properties of the fat formulations. Exemplary properties can include: taste, surface tension, lipid solubility, nutritional value, rheological behavior, properties of the fat formulation to mimic a target fat, oxidation, optical properties (e.g., color, reflectance, translucence, etc.), and/or any suitable properties. Exemplary additives include flavorants, antioxidants, glycerides (e.g., monoglycerides, diglycerides, etc. such as of fatty acids of the fat formulation), byproducts (e.g., from a fatty acid synthesis, from esterification, etc.), nutritional additives, colorants, and/or any suitable additives. Additives are preferably GRAS certified (e.g., are food safe, are considered safe to consume, etc.). However, in some variants, the additives may not have GRAS certification and/or may not be food safe.

Flavorants can function to modify a taste and/or smell of the fat formulation. Flavorants can include: esters, aldehydes, ketones, lactones (e.g., γ-lactones, S-lactones, macrocyclic lactones, polycyclic lactones, etc.), acids (e.g., citric acid, lactic acid, etc.), alcohols, and/or any suitable flavorants. For example, short chain (e.g., with between about 1 and 7 carbon atoms) fatty acids, fatty aldehydes, fatty ketones, fatty acid methyl esters, fatty alcohols, and/or any suitable materials can be used as flavorants. In another example, artificial butter flavorants (such as 2,3-butanedione or diacetyl, 2,3-pentanedione or acetylpropionyl, 2-hydroxy-3-butanone or acetoin, etc.) can be added to the fat formulation. In another example, artificial cheese flavorants (such as disodium inosinate, disodium guanylate, monosodium glutamate, autolyzed yeast extract, butyl butyryl lactate, ethyl cyclohexyl carboxylate, glyceryl tributyrate, heptanoic acid, 2-heptanone, 3-hexenoic acid, 2-methyl butyric acid, 2-methyl-4-pentenoic acid, methylthioisovalerate, 2-methyl valeric acid, 4-methyl valeric acid, 4-pentenoic acid, valeric acid, isovaleric acid, acetoin butyrate, isobutylamine, 2,4-dimethyl-2-pentenoic acid, 2,4-heptadien-1-ol, 2,3-heptanedione, 4-heptanone, 3-mercapto-3-methylbutanal, 4-methyl hexanoic acid, 5-methyl hexanoic acid, 2-methyl-2-hexenoic acid, 2-pentenoic acid, 4-pentenoic acid, propionic acid, ammonium isovalerate, etc.) can be used as flavorants. However, any suitable flavorants (and/or combination thereof including combinations of the preceding examples) can be used. Typically, the flavorant concentration within the fat formulation is small (e.g., less than 0.1% such as 1 ppb, 10 ppb, 100 ppb, 1 ppm, 10 ppm, 100 ppm, 500 ppm, 1000 ppm, etc.). However, the flavorant concentration can be greater than 0.1%.

Antioxidants can function to protect the fat formulation from degradation (e.g., oxidative degradation, auto-oxidation, light-based degradation, etc.) and/or increase a shelf life of the fat formulation. Some variants of fat formulations can omit the antioxidants, particularly but not exclusively fat formulations that use saturated fatty acids, as the fat formulation and/or constituents thereof can be sufficiently stable without an antioxidant. Exemplary antioxidants include: ascorbic acid, butylated hydroxyanisole (BHA), butylated hydroxytoluene (BHT), 2,6-di-tert-butylphenol, propyl gallate, hydroxytyrosol, tyrosol, caffeic acid, citric acid, ferulic acid, alkannin, shikonin, carnosic acid, alpha-tocopherol, ethylenediamines, ethylenediaminetetraacetic acid (EDTA), gallic acid, glutathione, 6-hydroxymelatonin, acetyle-L-carnitine (ALCAR), alpha-lipoic acid (ALA), ascorbic acid, curcumin, edaravone, polyphenols, L-carnitine, ladostigil, melatonin, mofegiline, N-acetylcysteine (NAC), N-acetyl-serotonin (NAS), oleocanthal, oleuropein, rasagiline, resveratrol, selegiline, selenium, terpenes and/or terpenoids (e.g., cyclic diterpene diphenols, hemiterpenoids, monoterpenes, monoterpenoids, sesquiterpenoids, diterpenoids, sesquarterpenes/oids, tetraterpenoids or carotenoids, etc. such as 1,8-cineole, camphor, pulegone, borneol, limonene, α-pinene, linalool, carvacrol, p-cymene, thujanol, β-pinene, α-campholenal, citronellol, thymol, β-myrcene, Italicene epoxide, guaiol, 1,10-di-epi-cubenol, 8-cedren-13-ol, (Z)-α-trans-bergamotol, α-copaene, β-costol, spathulenol, ß-bourbonene, δ-cadinene, ß-caryophyllene, ß-farnesene, etc.), tocopherols, tocotrienols, ubiquinone, uric acid, carnosolic acid, carnosol, catechin, quercetin, myricetin, catechin, genistein, sesamol, oleuropein, carnosic oryzanols, tocols, ferulic acid, beta-carotene, lycopene, extracts from the Lamiaceae family (e.g., rosemary oil, thyme oil, basil oil, mint oil, sage oil, savory oil, marjoram oil, oregano oil, hyssop oil, lavender oil, perilla oil, sativa oil, extracts or molecular constituents therefrom one or more of the preceding, etc.), and/or any suitable antioxidants could be used.

Byproducts (e.g., from the fatty acid synthesis, from the esterification, etc.) can remain in the fat formulation after purification, fat formulation mixing, can be introduced during the fat formulation production (e.g., be intentionally added), and/or can otherwise occur within the fat formulation. The byproducts can be beneficial as tracers (e.g., identifying a source, manufacturing method, etc. of the fatty acids). However, different tracers can be included (e.g., as an additive). The byproducts are preferably nontoxic.

Nutritional additives can function to modify a nutritional content of the fat formulation. For example, nutritional additives can add essential (or nonessential) nutrients (e.g., vitamins, minerals, etc.), modify a calorie density of the fat formulation, and/or can otherwise modify a nutritional content of the fat formulation. In one variation, fat-soluble vitamins (e.g., vitamins A, D, E, or K) can be added to the fat formulation (e.g., to provide between 1-500% of the daily recommended value of the vitamin per serving of the fat formulation). In another variation, fats (e.g., essential fatty acids such as alpha-linoleic acid and/or linoleic acid for humans, arachidonic acid, docosahexaenoic acid, etc.; conditionally essential fatty acids such as eicosapentaenoic acid, gamma-linolenic acid, dihomo-γ-linolenic acid, etc.; long chain polyunsaturated fatty acids; short chain polyunsaturated fatty acids; unsaturated fatty acids such as Ω-3, Ω-6, Ω-9, oleic acid, etc.; conjugated fatty acids such as calendic acid, rumenic acid, etc.; etc.) can be added to the fat formulation. For instance, between about 250 mg and 5000 mg of unsaturated fats (per serving of fat formulation, per 1-100 grams of fat formulation, per 1-100 grams of fatty acids in the fat formulation, etc.) can be added to the fat formulation. When provided as glycerides, the unsaturated fats can be interesterified with the saturated fatty acids, can be interesterified with themselves (e.g., interesterify different unsaturated fatty acids), can be homoesters (e.g., that are physically mixed with other glycerides or fatty acids), and/or can otherwise be esterified with any suitable species and/or otherwise be included in the fat formulation (e.g., as free fatty acids, as fatty acid esters, etc.). In a third variation, minerals (e.g., lithium, sodium, potassium, rubidium, magnesium, calcium, strontium, vanadium, chromium, manganese, iron, cobalt, nickel, copper zinc, molybdenum, cadmium, tungsten, lanthanum, cerium, praseodymium, neodymium, samarium, boron, aluminium, silicon, germanium, tin, phosphorus, sulphur, selenium, fluorine, chlorine, bromine, iodine, etc.) can be added to the fat formulation. In the third variation, a mineral can be added, for example, as a conjugate base or salt of a free fatty acid constituent of the fat formulation. For instance, calcium could be added to a fat formulation that includes capric acid (free capric acid, capric acid as a constituent of an ester such as a triglyceride, etc.) as calcium caprate. In other variants, minerals could be added to a fat formulation as caseinates (e.g., calcium caseinate). However, minerals can be added to the fat formulation in any manner (e.g., by dissolving or suspending the mineral in the lipids, using a base associated with the mineral, by adding a salt of the mineral, etc.). In another variant, a solvent (such as water) included in the lipid formulation can include water-soluble minerals or vitamins (e.g. folate, thiamine, riboflavin, niacin, pantothenic acid, biotin, vitamin B6, vitamin B12, vitamin C). However, any suitable nutritional additives can be used.

Colorants can function to modify a color or appearance of the fat formulation. For instance, colorants can be added to make a fat formulation match an expected color for a given product, for tracing, for holiday themes, to promote and/or discourage consumption, for cosmetic purposes, and/or can otherwise be used. As a specific example, carotenoids (e.g., hydrocarbon carotenes such as α-carotene, β-carotene, γ-carotene, δ-carotene, ε-carotene, ξ-carotene, lycopene, neurosporene, etc.; terpenes such as tetraterpenoids; xanthanophylls or phylloxanthins such as lutein, zeaxanthin, neoxanthin, violaxanthin, flavoxanthin, α-cryptoxanthin, β-cryptoxanthin, crocin, bixin, norbixin, etc.; anthocyanins; etc.) can be included in the fat formulation to provide a color (e.g., particularly but not exclusively a red, orange, yellow, etc. color). However, additionally or alternatively, diarylheptanoids (e.g., curcumin, Demethoxycurcumin, Bisdemethoxycurcumin, Rosocyanine, Rubrocurcumin, myricanone, ostryopsitrienol, ostryopsitriol, etc.) and/or any suitable pigments (e.g., natural or artificial pigments) can be used. The carotenoids can be derived from a plant source (e.g., annatto, saffron, carrot, etc.), animal source, artificially produced, and/or can be derived from any suitable source.

When the fat formulation is used to make a food product (such as a lacticinia or plant-based dairy alternative), the fat formulation can be combined with one or more proteins, nucleic acids, carbohydrates, and/or other suitable components. As a first illustrative example, a ghee or clarified butter food product can include approximately 99% (e.g., 98-99.9% such as by mass, by volume, by stoichiometry, etc.) fat formulation (e.g., as described above), approximately 0.8% (e.g., 0.3-1.5% such as by mass, by volume, by stoichiometry, etc.) proteins, and approximately 0.2% (e.g., 0.05%-0.5% such as by mass, by volume, by stoichiometry, etc.) water. As a second illustrative example, a milk product (e.g., animal such as cow, sheep, goat, camel, etc. mimic, replica, functional analogue, etc.) can include about 0.5-10% (e.g., 0.25-11% such as by mass, by volume, by stoichiometry, etc.) fat formulation, about 1-10% (e.g., 0.9-11% such as by mass, by volume, by stoichiometry, etc.) proteins, about 1-10% (e.g., 0.9-11% such as by mass, by volume, by stoichiometry, etc.) carbohydrates, up to about 1-2% (e.g., 0-2.5% such as by mass, by volume, by stoichiometry, etc.) vitamins and/or minerals (also referred to as ash), a total solid content between about 7.5% and 20% (e.g., 7-22% such as by mass, by volume, by stoichiometry, etc.), and the remainder water. Variations of the second illustrative example (e.g., to form plant-based, dairy-alternative milk, dairy-free milk, etc. such as coconut milk, cashew milk, almond milk, soy milk, hemp milk, oat milk, rice milk, spelt milk, etc.) can include (e.g., in addition to and/or as an alternative to existing fats from the derivative productions) the fat formulation (e.g., to supplement a total fat content of the milk alternative to a target percentage such as a percentage as in the second illustrative example, to replace fat existing in the product, etc.). As a third illustrative example a yogurt product (e.g., dairy-based yogurt, plant-based yogurt, etc.) can include at least 8.25% solids (not counting fat), between 0.5% and 10% (e.g., 0.25-11% such as by mass, by volume, by stoichiometry, etc.) fat formulation, about 3-25% (e.g., 2.7-27.5% such as by mass, by volume, by stoichiometry, etc.) carbohydrates, about 3-15% (e.g., 2.7-16.5% such as by mass, by volume, by stoichiometry, etc.) protein, up to about 1-2% (e.g., 0-2.5% such as by mass, by volume, by stoichiometry, etc.) vitamins and/or minerals (also referred to as ash), and the remainder to add up to 100% total content water (e.g., at most about 91.75% water). As a fourth illustrative example, an ice cream product can include about 5%-25% (e.g., 4.5-27.5% such as by mass, by volume, by stoichiometry, etc.) fat composition, about 5-15% (e.g., 4.5-16.5% such as by mass, by volume, by stoichiometry, etc.) solids-not-fat (snf), about 2-8% (e.g., 1.8-8.8 such as by mass, by volume, by stoichiometry, etc.) proteins, about 5-20% (e.g., 4.5-22% such as by mass, by volume, by stoichiometry, etc.) carbohydrates, up to about 2% (e.g., 0-2.2% such as by mass, by volume, by stoichiometry, etc.) vitamins and/or minerals (also referred to as ash such as calcium, phosphorous, potassium, sodium, etc.), up to to about 1% (e.g., 0-1.2% such as by mass, by volume, by stoichiometry, etc.) food excipients (e.g., stabilizers, emulsifiers, flavorants, etc.), and the remainder water to add up to 100% (e.g., typically in a range of about 50-70%). As a fifth illustrative example, a cheese product can include about 20-40% (e.g., 18-44% such as by mass, by volume, by stoichiometry, etc.) fat composition, about 15-30% (e.g., 13.5-33% such as by mass, by volume, by stoichiometry, etc.) proteins, about 1-5% (e.g., 0.9-5.5% such as by mass, by volume, by stoichiometry, etc.) salt, about 20-40% (e.g., 18-44% such as by mass, by volume, by stoichiometry, etc.) carbohydrates, up to about 2% (e.g., 0-2.2% such as by mass, by volume, by stoichiometry, etc.) vitamins and/or minerals (also referred to as ash such as calcium, phosphorous, potassium, sodium, etc.), a fat on dry basis that is greater than about 40%, and the remainder water to add up to 100% (e.g., typically in a range of about 30-50%). As a sixth illustrative example, a butter product can include about 75-99% (e.g., 67.5-10% such as by mass, by volume, by stoichiometry, etc.) fat composition, up to about 2% (e.g., 0-2.5% such as by mass, by volume, by stoichiometry, etc.) solids-not-fat (snf) (e.g., proteins, carbohydrates, vitamins, minerals, etc.), up to about 3% (e.g., 0-3.3% such as by mass, by volume, by stoichiometry, etc.) salt (e.g., sodium chloride), and the remainder water to add up to 100% (e.g., typically in a range of about 10-25%). However, any suitable products can be made using the fat composition (e.g., frozen meals, bakery items, pasta, etc.).

In variations of each of the above illustrative example, a portion of the fat formulation (e.g., 0-90% of the total amount of fat) can be replaced with a different fat (e.g., a plant fat such as coconut oil, palm oil, etc.; an animal fat such as fish oil, animal-derived milkfat, lard, etc.; a fat formulation as disclosed in U.S. patent application Ser. No. 18/210,226 titled "FAT FORMULATIONS" filed 15 Jun. 2023 which is incorporated in its entirety by this reference; etc.).

In variations of the above illustrative examples, the proteins can include synthetic proteins, animal proteins, plant proteins, fungi proteins, cultured proteins, and/or any suitable protein(s). For example, the proteins can include whey protein (e.g., β-lactoglobulin, α-lactalbumin, serum albumin, immunoglobulins, etc.), casein (e.g., caseinates, A1 β-casein, A2 β-casein, etc.), vegetable proteins (e.g., soy protein, pea protein, etc.), and/or any suitable proteins.

In variations of the above illustrative examples, the carbohydrates (e.g., saccharides) can include synthetic carbohydrates, animal-derived carbohydrates, plant-derived carbohydrates, fungi-derived carbohydrates, cultured carbohydrates, and/or any suitable carbohydrates. The carbohydrates can include monosaccharides, disaccharides, oligosaccharides, polysaccharides, and/or derivatives thereof (e.g., amnio sugars, sulfosugars, sugar alcohols, etc.). Exemplary carbohydrates include: allose, altrose, galactose, glucose (dextrose), gulose, idose, mannose, talose, fructose (levulose), psicose, sorbose, tagatose, fucose, fuculose, rhamnose, glyceraldehyde, dihydroxyacetone, erythrose, threose, erythrulose, arabinose, lyxose, ribose, xylose, ribulose, xylilose, deoxyribose, mannoheptulose, sedoheptulose, cellobiose, isomaltose, isomaltulose, lactose, lactulose, maltose, sucrose, trehalose, turanose, maltotriose, melezitose, raffinose, stachyose, acarbose, fructooliogosaccharide, galactooligosaccharise, isomaltooligosaccharide, maltodextrin, beta-glucan, lentinan, sizofiran, zymosan, cellulose, chitin, chitosan, dextrin/dextran, fructan, galactan, glucan, hemicellulose, levan beta 2à6, mannan, pectin, starch, amylopectin, amylose, xanthan gum, corn syrup, corn syrup solids, and/or other suitable carbohydrates or dietary fibers (e.g., lignin) can be used.

Note that while the term carbohydrate is used, sugar substitutes (e.g., aspartame, monk fruit extract, saccharin, sucralose, stevia, acesulfame potassium, cyclamate, sugar alcohols, etc.) can additionally or alternatively be used (particularly but not exclusively when the carbohydrate's primary function is to provide sweetness to the product and/or formulation).

The inclusion of proteins and/or carbohydrates can be beneficial for forming a milk fat solid formulation (e.g., for creating a formulation that mimics milk fat solids, which may also benefit from inclusion of carbohydrates and/or sugars particularly but not exclusively lactose). Therefore, in some variants, the fat formulation itself can include proteins and/or carbohydrates. However, proteins and/or carbohydrates can provide any suitable technical advantage in products and/or formulations that include them (e.g., proteins and/or carbohydrates can be included to facilitate browning, Maillard reaction, etc. to transform color, flavor, etc. of the formulation or product).

In some variants, the fat formulation can be tempered (e.g., fully melted before recrystallizing the fat composition, maintained at a tempering temperature that is typically greater than room temperature for a predetermined time, etc.).

In some variants, the fat formulation can be mechanically processed (e.g. scraped against a cold surface, scraped against a surface that is slowly decreasing in temperature, whipped with air or nitrogen at room temperature, whipped with air or nitrogen at temperature that is lower than room temperature, high shear blending, etc.), which can result in aeration of the fat formulation (and/or product derived therefrom).

Figure 6A:
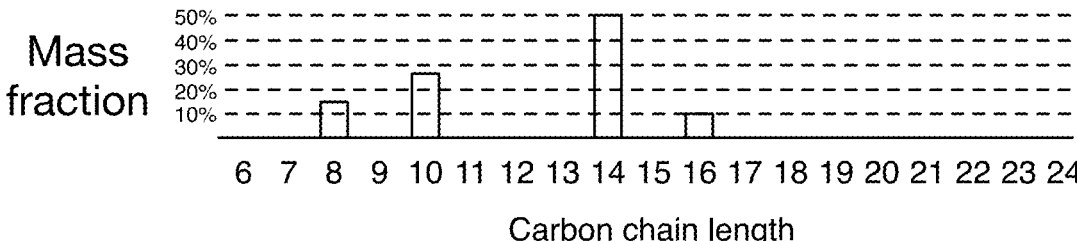
FIGS. 6A and 6B are histogramic representations of exemplary milk fat fat formulations.

In a first illustrative example (as shown for instance in FIG. 6A or FIG. 7A), a lipid composition of a milkfat or butterfat formulation can include about 15% (e.g., 5-20%) caprylic acid, about 25% (e.g., 20-30%) capric acid, about 50% (e.g., 30-70%) myristic acid, and about 10% (e.g., 5-20%) palmitic acid, where percentages can refer to mass percentages, approximate mass percentages (e.g., mass percentages neglecting an impact to mass percentage variation resulting from dehydration or formation of esters such as glycerides), volume percentages, stoichiometric percentage, and/or to any suitable percentage. The fat formulation can be a gapped formulation (e.g., excluding lauric acid). The fatty acids are preferably artificially manufactured, but can be naturally derived (e.g., recovered or sourced from plants, animals, fungi, microbial fermentation, etc.) and/or can otherwise be produced. In variations of the first illustrative example, the fat formulation preferably includes about 40% fatty acids with a chain length less than a threshold number of carbon atoms (e.g., fatty acids with a chain length shorter than a gap or an excluded fatty acid such as lauric acid in this illustrative example, fatty acids with a chain length less than about 12 carbon atoms, etc.) and about 60% fatty acids with a chain length greater than the threshold number of carbon atoms (e.g., fatty acids with a chain length longer than a gap or an excluded fatty acid such as lauric acid in this illustrative example, fatty acids with a chain length greater than 13 carbon atoms, etc.). In variations of this illustrative example, the fatty acids can form (e.g., be included in) heteroglycerides (e.g., heterotriglycerides, be interesterified, etc.), the fatty acids can form heteroglycerides with common fatty acids (e.g., fatty acids with chain length less than the threshold chain length can form heteroglycerides, fatty acids with chain length greater than the threshold chain length can form heteroglycerides, etc.), fatty acids can form heteroglycerides with dissimilar fatty acids (e.g., one or more fatty acids with a chain length less than the threshold length can form heteroglycerides with one or more fatty acids with a chain length greater than the threshold length), the fatty acids can form homotriglycerides (e.g., which can then be physically mixed, which can then undergo an interesterification process), and/or the fatty acids can otherwise be esterified. In a variation of the first specific example (as shown for instance as EX 3 in FIG. 7A), the lipid composition of the formulation can include a trivial amount (e.g., <5% total) of short chain and/or longer chain fatty acids (such as butyric acid, caproic acid, stearic acid, arachidic acid, etc.).

Figure 6B:
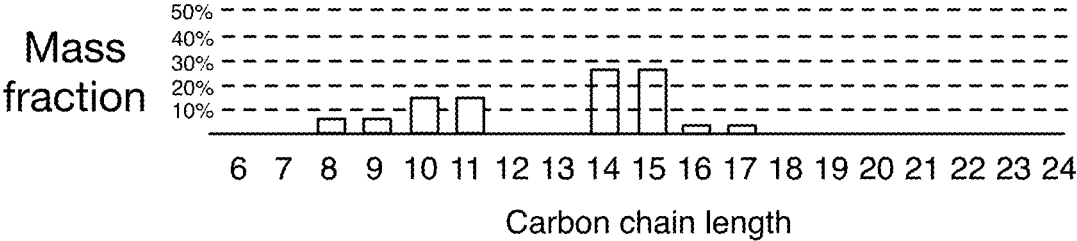

In a second illustrative example (as shown for instance in FIG. 6B or FIG. 7A), a lipid composition of a milk fat or butter fat formulation can include about 7.5% (e.g., 0-15%) caprylic acid, about 7.5% (e.g., 0-15%) pelargonic acid, about 12.5% (e.g., 0-25%) capric acid, about 12.5% (e.g., 0-25%) undecylic acid, about 25% (e.g., 0-50%) myristic acid, about 25% (e.g., 0-50%) pentadecylic acid, about 5% (e.g., 0-10%) palmitic acid, and about 5% (e.g., 0-10%) margaric acid, where percentages can refer to mass percentages, approximate mass percentages (e.g., mass percentages neglecting an impact to mass percentage variation resulting from dehydration or formation of esters such as glycerides), volume percentages, stoichiometric percentage, and/or to any suitable percentage. In a variation of the second specific example (as shown for instance as EX 4 in FIG. 7A), the lipid composition of the formulation can include a trivial amount (e.g., <5% total) of short chain and/or longer chain fatty acids (such as butyric acid, valeric acid, caproic acid, enanthic acid, stearic acid, nonadecylic acid, arachidic acid, heneicosylic acid, etc.).

In a third illustrative example (as shown for instance as EX 5 in FIG. 7A), a lipid composition for a milk fat or butterfat mimicking formulation can include C8, C10, C14, and C16 fatty acids. In this illustrative example (as well as other illustrative examples), the constituent fatty acids may not be pure (e.g., may include other fatty acids with similar molecular weight or chain lengths). For instance, during purification or extraction steps, the fatty acid composition for C8 may additionally include C7 and/or C9 fatty acids (and potentially C6 and C10) and so on for other fatty acid lengths included in the formulation.

In a fourth illustrative example (as shown for instance as EX6 in FIG. 7A), a fat formulation for a milk fat or butterfat mimicking formulation can include about 7.5% hexanoic acid, about 7.5% heptanoic acid, about 12.5% octanoic acid, about 12.5% nonanoic acid, about 25% dodecanoic acid, about 25% tridecanoic acid, about 5% tetradecanoic acid, and about 5% pentadecanoic acid; where the percentages can be mass percentages, volume percentages, stoichiometric percentages, and/or other suitable percentages; where the carboxylic acids are esterified with glycerol to form triglycerides.

In a fifth illustrative example (as shown for instance as EX7, EX8, EX9, EX12, EX13, and/or EX14 in FIG. 7B or FIG. 7C), a fat formulation for a milk fat or butterfat mimicking formulation can include C8:0-C15:0 carboxylic acids; where the carboxylic acids are esterified with glycerol to form triglycerides. For instance, the fat formulation can include about 10-15% octanoic acid, about 10-15% nonanoic acid, about 0-20% decanoic acid, about 0-20% undecanoic acid, about 0-20% dodecanoic acid, about 0-20% tridecanoic acid, about 10-20% tetradecanoic acid, and about 10-20% pentadecanoic acid (where the percentages add up to 100% and can refer to mass percent, volume percent, stoichiometric percent, etc.). In variations, the total contributions from paired fatty acids can be distributed in any manner between each fatty acid of the pair.

In a sixth illustrative example (as shown for instance as EX10, EX11, EX15, EX16, and/or EX17 in FIG. 7B or FIG.

7C), a fat formulation for a milk fat or butterfat mimicking formulation can include C8:0-C17:0 carboxylic acids; where the carboxylic acids are esterified with glycerol to form triglycerides (e.g., heterotriglycerides). For instance the fat formulation can include about 5-12.5% octanoic acid, about 0-12.5% nonanoic acid, about 0-25% decanoic acid, about 0-25% undecanoic acid, about 14-30% dodecanoic acid, about 0-30% tridecanoic acid, about 5-15% tetradecanoic acid, about 0-15% pentadecanoic acid, about 5-35% hexdecanoic acid, and about 0-35% heptadecanoic acid (where the percentages add up to 100% and can refer to mass percent, volume percent, stoichiometric percent, etc.). In variations, the total contributions from paired fatty acids can be distributed in any manner between each fatty acid of the pair.

In a seventh illustrative example, a milkfat functional analogue can include triacylglycerides that include (e.g., consist of, are composed of, consist essentially of, are composed essentially of, etc.) glycerol esterified with straight-chain saturated fatty acids, where a solid fat content as a function of temperature of the triacylglycerides differs from a solid fat content of butterfat by at most 0.1 at any temperature between 0° C. and 40° C. In variations of the seventh illustrative example, the solid fat content can be measured using differential scanning calorimetry. In variations of the seventh illustrative example, the solid fat content of the triacylglycerides is approximately 0 at a temperature lower than the temperature where the solid fat content of the butterfat is 0. In variations of the seventh illustrative example, the temperature is lower than the temperature where the solid fat content of the butterfat is 0 by at most about 2.5° C. In variations of the seventh illustrative example, the straight-chain saturated fatty acids include fatty acids with even numbers of carbon atom and fatty acids with odd numbers of carbon atoms. In variations of the seventh illustrative example, the straight-chain saturated fatty acids include only (e.g., consist essentially of, consist of, are composed essentially of, are composed of, etc.) fatty acids with between 6 and 17 carbon atoms. In variations of the seventh illustrative example, the straight-chain saturated fatty acids include approximately equal amounts of fatty acids with melting temperatures that differ by at most 5° C. (e.g., paired fatty acids). In variations of the seventh illustrative example, a texture of the triacylglycerides as measured using a texture analyzer differs from a texture of the butterfat as measured using the texture analyzer by at most about 25%. In variations of the seventh illustrative example, the butterfat can be derived from milk from a cow.

In an eighth illustrative example, a method for forming a fat formulation (e.g., as described above, any of the preceding illustrative examples of fat formulations, etc.) can include: combining (e.g., mixing, agitating, stirring, etc.) glycerol with a distribution of free fatty acids (e.g., in an approximately 1:3 stoichiometric ratio, i.e., for each molecule of glycerol 3 molecules of free fatty acid are present); esterifying the glycerol with the distribution of free fatty acids (e.g., using acid or base catalyzed esterification or not using a catalyst); and optionally purifying the esters (e.g., triacylglycerides) such as via deodorization, chemical separations, physical separations, and/or other means. In variations of the eighth illustrative example, the fatty acids of the distribution can be obtained chemically (e.g., formed via synthesis such as from oxidation of paraffins to fatty acids, Fischer-Tropsch synthesis, Ziegler synthesis, etc.), via fermentation, via extraction (e.g., from plant and/or animal source(s), and/or from any suitable source. In variations, the eighth illustrative example can include tempering the esters (e.g., via heating the esters to a tempering temperature such as a temperature exceeding a melting point of the esters). Variations of the eighth illustrative example can include characterizing the esters and/or fat formulation (e.g., thermal characterization, rheometric characterization, flavor characterization, structural characterization, mechanical characterization, etc.).

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20% of a reference), or be otherwise interpreted. As used herein, C # nomenclature is used as shorthand to refer to a fatty acid with a carbon chain length that is equal to the number. C # can refer to a single fatty acid and/or a distribution of fatty acids (e.g., centered about C #, with the greatest contribution in the distribution coming from C #, etc. such as resulting from incomplete fractionation, separation, etc.). Typically, the distribution about C # will only include neighboring fatty acids (e.g., C #−1 and/or C #+1). However, other fatty acids may be present in the distribution about C #. As used herein, the distributions generally exclude the contribution from glycerol in the total composition of the fat formulation (or lipid component thereof).

We claim:

1. A fat formulation consisting of:

at least 95% by mass triglycerides consisting of straight-chain, saturated fatty acids; wherein the straight-chain, saturated fatty acids comprise a distribution of fatty acids with between 6 and 16 carbon atoms, wherein the distribution comprises a non-monotonic change in relative fatty acid content between the fatty acids with between 6 and 16 carbon atoms, wherein the distribution of fatty acids consists of fatty acids with an even number of carbon atoms, wherein the distribution of fatty acids consists of:

less than 0.5% by mass C6:0 fatty acid;

less than 0.5% by mass C7:0 fatty acid;

between 10 and 15% by mass C8:0 fatty acid;

less than 0.5% by mass C9:0 fatty acid;

between 20 and 30% by mass C10:0 fatty acid;

less than 0.5% by mass C11:0 fatty acid;

between 25 and 35% by mass C12:0 fatty acid;

less than 0.5% by mass C13:0 fatty acid;

between 0 and 5% by mass C14:0 fatty acid;

less than 0.5% by mass C15:0 fatty acid; and between 25 and 40% by mass C16:0 fatty acid; wherein the total percentage adds up to 100%; and at most 5% by mass of an additive selected from the group consisting of flavorants, antioxidants, vitamins, minerals, colorants, and combinations thereof.

2. The fat formulation of claim 1, wherein a hydroxyl number of the triglycerides is between 0 and 30.

3. The fat formulation of claim 1, wherein the distribution of fatty acids with between 6 and 16 carbon atoms of the triglycerides are heterotriglycerides.

4. A lacticinia or alternative-milk lacticinia comprising at most 97% by mass of the fat formulation of claim 1 and at least 3% by mass of non-fat ingredients.

5. The lacticinia or alternative-milk lacticinia of claim 4, wherein the non-fat ingredients comprise at least one of an animal-derived protein, a plant-derived protein, a cultured protein, or a carbohydrate.

6. A fat formulation consisting of:

at least 95% by mass triglycerides consisting of straight-chain, saturated fatty acids; wherein the straight-chain, saturated fatty acids comprise a distribution of fatty acids with between 6 and 16 carbon atoms, wherein the distribution comprises a non-monotonic change in relative fatty acid content between the fatty acids with between 6 and 16 carbon atoms, wherein the distribution of fatty acids consists of:

less than 0.5% by mass C6:0 fatty acid;

less than 0.5% by mass C7:0 fatty acid;

between 5 and 15% by mass C8:0 fatty acid;

between 5 and 15% by mass C9:0 fatty acid;

between 5 and 25% by mass C10:0 fatty acid;

between 5 and 25% by mass C11:0 fatty acid;

between 0 and 20% by mass C12:0 fatty acid;

between 0 and 20% by mass C13:0 fatty acid;

between 15 and 25% by mass C14:0 fatty acid;

between 15 and 25% by mass C15:0 fatty acid; and between 0 and 10% by mass C16:0 fatty acid; wherein the total percentage adds up to 100%; and at most 5% by mass of an additive selected from the group consisting of flavorants, antioxidants, vitamins, minerals, colorants, and combinations thereof.

7. The fat formulation of claim 6, wherein a hydroxyl number of the triglycerides is between 0 and 30.

8. The fat formulation of claim 6, wherein the distribution of fatty acids with between 6 and 16 carbon atoms of the triglycerides are heterotriglycerides.

9. A lacticinia or alternative-milk lacticinia comprising at most 97% by mass of the fat formulation of claim 6 and at least 3% by mass of non-fat ingredients.

10. The lacticinia or alternative-milk lacticinia of claim 9, wherein the non-fat ingredients comprise at least one of an animal-derived protein, a plant-derived protein, a cultured protein, or a carbohydrate.

11. The fat formulation of claim 4, wherein the distribution of fatty acids consists of 10% by mass C8:0 fatty acid, 10% by mass C9:0 fatty acid, 5% by mass C10:0 fatty acid, 5% by mass C11:0 fatty acid, 15% by mass C12:0 fatty acid, 15% by mass C13:0 fatty acid, 20% by mass C14:0 fatty acid, and 20% by mass C15:0 fatty acid.

\* \* \* \* \*